United States Patent
Dubois et al.

(10) Patent No.: US 11,190,737 B2
(45) Date of Patent: Nov. 30, 2021

(54) METHOD AND SYSTEM FOR IDENTIFYING A VIDEO CAMERA OF A VIDEO SURVEILLANCE ENVIRONMENT

(71) Applicant: GENETEC INC., Saint-Laurent (CA)

(72) Inventors: Frédéric Dubois, Laval (CA); Yannick Nadeau, Montréal (CA); Marc-André Beaudoin, Vaudreuil-Dorion (CA); Mélanie Truchon, Laval (CA)

(73) Assignee: GENETEC INC., St-Laurent (CA)

( * ) Notice: Subject to any disclaimer, the term of this patent is extended or adjusted under 35 U.S.C. 154(b) by 0 days.

(21) Appl. No.: 16/863,034

(22) Filed: Apr. 30, 2020

(65) Prior Publication Data
US 2021/0344875 A1    Nov. 4, 2021

(51) Int. Cl.
*H04N 7/18* (2006.01)
*G06K 9/00* (2006.01)
*H04N 5/247* (2006.01)
*H04N 7/025* (2006.01)
*G06K 9/62* (2006.01)

(52) U.S. Cl.
CPC ......... *H04N 7/181* (2013.01); *G06K 9/00744* (2013.01); *G06K 9/00771* (2013.01); *G06K 9/6202* (2013.01); *H04N 5/247* (2013.01); *H04N 7/025* (2013.01)

(58) Field of Classification Search
CPC . H04N 7/181; G06K 9/00744; G06K 9/00771
USPC ....................................................... 348/159
See application file for complete search history.

(56) References Cited

U.S. PATENT DOCUMENTS

| | | | |
|---|---|---|---|
| 7,455,229 | B2 | 11/2008 | Tanaka |
| 8,115,819 | B2 | 2/2012 | Anderson |
| 8,215,541 | B2 | 7/2012 | Bucher et al. |
| 9,495,530 | B2 | 11/2016 | Dittrich |
| 2004/0222300 | A1 | 11/2004 | Strickland |
| 2005/0203912 | A1 | 9/2005 | Beach et al. |
| 2005/0282531 | A1 | 12/2005 | Andreasson |
| 2006/0135064 | A1 | 6/2006 | Cho et al. |
| 2006/0285126 | A1 | 12/2006 | Braswell et al. |
| 2008/0250122 | A1 | 10/2008 | Zsigmond et al. |
| 2012/0239923 | A1 | 9/2012 | Karl et al. |
| 2012/0282884 | A1 | 11/2012 | Sun |
| 2013/0229511 | A1 | 9/2013 | Oostendorp et al. |
| 2014/0025795 | A1 | 1/2014 | Fiennnes |

(Continued)

FOREIGN PATENT DOCUMENTS

CN            205232324        5/2011

*Primary Examiner* — Amir Shahnami
(74) *Attorney, Agent, or Firm* — Norton Rose Fulbright Canada

(57) ABSTRACT

Methods, systems, devices and computer readable media for identifying a video camera of a video surveillance system are provided. A plurality of video streams of a plurality of video cameras are obtained. At least one video camera of the plurality of video cameras captures a visual identifier outputted by a mobile device. The visual identifier is detected in at least one video stream of the plurality of video streams based on searching for the visual identifier in the plurality of video streams. The at least one video camera capturing the visual identifier is identified from the at least one video stream having the visual identifier detected therein. Identification information of the at least one video camera capturing the visual identifier is transmitted to the mobile device.

29 Claims, 6 Drawing Sheets

(56) References Cited

U.S. PATENT DOCUMENTS

| | | | |
|---|---|---|---|
| 2015/0022666 A1 | 1/2015 | Kay et al. | |
| 2016/0021292 A1* | 1/2016 | Zhang | H04N 5/247 348/211.2 |
| 2016/0357762 A1* | 12/2016 | Aghdasi | G06F 16/71 |
| 2017/0054902 A1 | 2/2017 | Park | |
| 2017/0064238 A1 | 3/2017 | Kardashov | |
| 2017/0195386 A1 | 7/2017 | Nathan et al. | |
| 2017/0278365 A1 | 9/2017 | Madar et al. | |
| 2017/0280488 A1 | 9/2017 | Kawasaki | |
| 2018/0063120 A1 | 3/2018 | Kim et al. | |
| 2018/0070001 A1* | 3/2018 | Nassor | H04N 7/181 |
| 2018/0225444 A1 | 8/2018 | Frenz | |
| 2018/0270066 A1 | 9/2018 | Doyon et al. | |
| 2019/0114413 A1 | 4/2019 | Ozaki | |
| 2019/0149772 A1 | 5/2019 | Fernandes et al. | |
| 2019/0238405 A1 | 8/2019 | Karivaradaswamy | |
| 2019/0244033 A1 | 8/2019 | Renkis | |
| 2020/0137354 A1 | 4/2020 | Nathan | |

\* cited by examiner

METHOD AND SYSTEM FOR IDENTIFYING A VIDEO CAMERA OF A VIDEO SURVEILLANCE ENVIRONMENT

TECHNICAL FIELD

The present disclosure relates generally to the field of video surveillance, and, more particularly, to methods and systems for identifying a video camera of a video surveillance environment.

BACKGROUND

A video surveillance environment may have a number of cameras connected to a server for the purpose of transmitting video data to the server. The server may archive the video data, manage and control the cameras, provide a workstation environment, for example, for a live view of the camera video streams, and/or provide access to camera video streams by remote workstations. Typically a video management system (VMS), a software component running on the server, provides the aforementioned functions of the server.

In a complex video surveillance environment where numerous cameras are deployed, it may be difficult for an operator to quickly identify a camera that he/she is in physical proximity therewith. This may be the case in buildings with similar looking areas (e.g., corridors, conference rooms, etc.) or when multiple cameras are installed in the same room. When trying to identify a camera amongst many, the operator may rely on naming conventions and/or logical organization from the VMS. When such configuration is deficient or when the operator is not familiar with the naming convention, it may be time consuming for the operator to identify a camera. The operator might have to manually look at all potential video streams and look for visual cues to identify the camera. Some cameras are equipped with a physical alert button that may be used to send a signal back to the VMS, which may be used to locate a camera, but this implies that the operator must physically gain access to the camera.

Thus, conventional techniques for identifying a camera of a video surveillance environment may be complicated, time consuming and/or cumbersome. As such, there is room for improvement.

SUMMARY

The present disclosure is generally drawn to methods, systems, devices, and computer readable media for identifying a video camera of a video surveillance environment.

In one aspect, there is provided a computer-implemented method for identifying at least one video camera of a video surveillance environment, the method comprises: obtaining a plurality of video streams of a plurality of video cameras, at least one video camera of the plurality of video cameras capturing a visual identifier outputted by a mobile device; detecting the visual identifier in at least one video stream of the plurality of video streams based on searching for the visual identifier in the plurality of video streams; identifying the at least one video camera capturing the visual identifier from the at least one video stream having the visual identifier detected therein; and transmitting identification information of the at least one video camera capturing the visual identifier to the mobile device.

In one aspect, there is provided a system for identifying at least one video camera of a video surveillance environment, the system comprises: at least one processing unit; and at least one non-transitory computer-readable memory having stored thereon program instructions executable by the at least one processing unit for: obtaining a plurality of video streams of a plurality of video cameras, at least one video camera of the plurality of video cameras capturing a visual identifier outputted by a mobile device; detecting the visual identifier in at least one video stream of the plurality of video streams based on searching for the visual identifier in the plurality of video streams; identifying the at least one video camera capturing the visual identifier from the at least one video stream having the visual identifier detected therein; and transmitting identification information of the at least one video camera capturing the visual identifier to the mobile device.

In one aspect, there is provided a non-transitory computer-readable medium having stored thereon program instructions executable by at least one processing unit for: obtaining a plurality of video streams of a plurality of video cameras, at least one video camera of the plurality of video cameras capturing a visual identifier outputted by a mobile device; detecting the visual identifier in at least one video stream of the plurality of video streams based on searching for the visual identifier in the plurality of video streams; identifying the at least one video camera capturing the visual identifier from the at least one video stream having the visual identifier detected therein; and transmitting identification information of the at least one video camera capturing the visual identifier to the mobile device.

In some embodiments, the visual identifier is time varying over a period of time, and detecting the visual identifier comprises processing images of the at least one video stream over a time frame corresponding to the period of time.

In some embodiments, the visual identifier is a flashing light pattern outputted by a light source of the mobile device.

In some embodiments, the flashing light pattern is an infrared light pattern, and wherein the light source is an infrared light source.

In some embodiments, the method further comprises transmitting timing information to the mobile device for the mobile device to at least in part generate the visual identifier therefrom.

In some embodiments, the program instructions are further executable by the at least one processing unit for transmitting timing information to the mobile device for the mobile device to at least in part generate the visual identifier therefrom.

In some embodiments, the visual identifier is a flashing light pattern, and the timing information comprises a maximum frequency for the flashing light pattern.

In some embodiments, the timing information comprises a minimum frame rate configuration of the plurality of video cameras.

In some embodiments, the method further comprises determining a minimum frames rate configuration of the plurality of video cameras, and determining the timing information based on the minimum frame rate configuration.

In some embodiments, the program instructions are further executable by the at least one processing unit for determining a minimum frames rate configuration of the plurality of video cameras, and determining the timing information based on the minimum frame rate configuration.

In some embodiments, searching for the flashing light pattern in the plurality of video streams comprises identifying light features in the plurality of video streams and comparing the light features to an expected flashing light pattern, and detecting the flashing light pattern comprises identifying the at least on video stream having the light features corresponding to the expected flashing light pattern.

In some embodiments, the method further comprises receiving location information from the mobile device, and selecting the plurality of video streams from a set of video streams based on the location information.

In some embodiments, the program instructions are further executable by the at least one processing unit for receiving location information from the mobile device, and selecting the plurality of video streams from a set of video streams based on the location information.

In one aspect, there is provided a computer-implemented method for identifying at least one video camera of a video surveillance environment, the method comprises: obtaining a plurality of video streams of a plurality of video cameras, at least one video camera of the plurality of video cameras capturing a visual identifier outputted by a mobile device; detecting the visual identifier in at least one video stream of the plurality of video streams based on searching for the visual identifier in the plurality of video streams; identifying the at least one video camera capturing the visual identifier from the at least one video stream having the visual identifier detected therein; and storing an indication of the at least one video camera capturing the visual identifier in a computer-readable memory or in at least one storage device.

In one aspect, there is provided a system for identifying at least one video camera of a video surveillance environment, the system comprises: at least one processing unit; and at least one non-transitory computer-readable memory having stored thereon program instructions executable by the at least one processing unit for: obtaining a plurality of video streams of a plurality of video cameras, at least one video camera of the plurality of video cameras capturing a visual identifier outputted by a mobile device; detecting the visual identifier in at least one video stream of the plurality of video streams based on searching for the visual identifier in the plurality of video streams; identifying the at least one video camera capturing the visual identifier from the at least one video stream having the visual identifier detected therein; and storing an indication of the at least one video camera capturing the visual identifier in the computer-readable memory or in at least one storage device.

In one aspect, there is provided a non-transitory computer-readable medium having stored thereon program instructions executable by at least one processing unit for: obtaining a plurality of video streams of a plurality of video cameras, at least one video camera of the plurality of video cameras capturing a visual identifier outputted by a mobile device; detecting the visual identifier in at least one video stream of the plurality of video streams based on searching for the visual identifier in the plurality of video streams; identifying the at least one video camera capturing the visual identifier from the at least one video stream having the visual identifier detected therein; and storing an indication of the at least one video camera capturing the visual identifier in the computer-readable memory or in at least one storage device.

In one aspect, there is provided a computer-implemented method of a mobile device, the method comprises: outputting a visual identifier, at least one video camera of a plurality of video cameras of a video surveillance environment capturing the visual identifier; transmitting an indication that the visual identifier is being output to a server of the video surveillance environment; receiving identification information of the at least one video camera capturing the visual identifier from the server; and displaying the identification information on a display of the mobile device.

In one aspect, there is provided a mobile device comprising: a display; at least one processing unit; and at least one non-transitory computer-readable memory having stored thereon program instructions executable by the at least one processing unit for: outputting a visual identifier, at least one video camera of a plurality of video cameras of a video surveillance environment capturing the visual identifier; transmitting an indication that the visual identifier is being output to a server of the video surveillance environment; receiving identification information of the at least one video camera capturing the visual identifier from the server; and displaying the identification information on the display.

In one aspect, there is provided a non-transitory computer-readable medium for a mobile device, the non-transitory computer-readable medium having stored thereon program instructions executable by at least one processing unit for: outputting a visual identifier, at least one video camera of a plurality of video cameras of a video surveillance environment capturing the visual identifier; transmitting an indication that the visual identifier is being output to a server of the video surveillance environment; receiving identification information of the at least one video camera capturing the visual identifier from the server; and displaying the identification information on a display of the mobile device.

In some embodiments, the visual identifier is time varying over a period of time.

In some embodiments, outputting the visual identifier comprises outputting a flashing light pattern with a controllable light source of the mobile device.

In some embodiments, the method further comprises receiving timing information for generating the visual identifier therefrom from the server, and generating the visual identifier at least in part from the timing information.

In some embodiments, the program instructions are further executable by the at least one processing unit for receiving timing information for generating the visual identifier therefrom from the server, and generating the visual identifier at least in part from the timing information.

In some embodiments, the visual identifier is a flashing light pattern, and the timing information comprises a maximum frequency for the flashing light pattern.

In some embodiments, the timing information comprises a minimum frame rate configuration of the plurality of video cameras.

In some embodiments, the method further comprises obtaining a list of at least some of the plurality of video cameras; associating the at least one video camera capturing the visual identifier in the list; and wherein displaying comprises displaying at least in part the list having the at least one video camera capturing the visual identifier identified therein.

In some embodiments, the program instructions are further executable by the at least one processing unit for obtaining a list of at least some of the plurality of video cameras; associating the at least one video camera capturing the visual identifier in the list; and wherein displaying comprises displaying at least in part the list having the at least one video camera capturing the visual identifier identified therein.

In one aspect, there is provided a computer-implemented method, the method comprises: obtaining a plurality of video streams of a plurality of video cameras, at least two video cameras of the plurality of video cameras capturing a visual identifier outputted by a mobile device; detecting the visual identifier in at least two video streams of the plurality of video streams based on searching for the visual identifier in the plurality of video streams; generating a new video stream from the at least two video streams having the visual identifier detected therein; and outputting the new video stream to a display device and/or storing the new video stream in a computer readable memory or a storage device.

In one aspect, there is provided a computer-implemented method, the method comprises: obtaining a plurality of video streams of a plurality of video cameras, at least one video camera of the plurality of video cameras capturing a visual identifier outputted by a mobile device; detecting the visual identifier in at least one video stream of the plurality of video streams based on searching for the visual identifier in the plurality of video streams; identifying the at least one camera capturing the visual identifier from the at least one video stream having the visual identifier detected therein; determining a geographical location of the at least one video camera capturing the visual identifier; and outputting the geographical location to a display device and/or storing the geographical location in a computer readable memory or a storage device.

In one aspect, there is provided a computer-implemented method, the method comprises: obtaining a plurality of video streams of a plurality of video cameras, at least one video camera of the plurality of video cameras capturing a visual identifier outputted by a mobile device of a user; detecting the visual identifier in at least one video stream of the plurality of video streams based on searching for the visual identifier in the plurality of video streams; identifying the at least one camera capturing the visual identifier from the at least one video stream having the visual identifier detected therein; determining a geographical location of the at least one video camera capturing the visual identifier; associating the geographical location to a location of the user; outputting the location of the user to a display device and/or storing the location of the user in a computer readable memory or a storage device.

In one aspect, there is provided a computer-implemented method, the method comprises: obtaining a plurality of video streams of a plurality of video cameras, at least one video camera of the plurality of video cameras capturing a visual identifier outputted by a mobile device; detecting the visual identifier in at least one video stream of the plurality of video streams based on searching for the visual identifier in the plurality of video streams; identifying the at least one camera capturing the visual identifier from the at least one video stream having the visual identifier detected therein; determining a position of the visual identifier in at least one image of the at least one video stream having the visual identifier detected therein; determining a command for the at least one camera capturing the visual identifier to adjust a viewpoint of the at least one camera based on the position of the visual identifier; and transmitting the command to the at least one camera capturing the visual identifier.

In one aspect, there is provided a computer-implemented method of a video camera of a video surveillance environment, the method comprising: generating a video stream having a visual identifier captured therein, the visual identifier outputted by a mobile device; detecting the visual identifier in the video stream based on searching for the visual identifier in the video stream; transmitting identification information of the video camera capturing the visual identifier to a server.

In another aspect, a system is provided, the system comprises: at least one processing unit; and at least one non-transitory computer-readable memory having stored thereon program instructions executable by the at least one processing unit for performing any of the aforementioned methods. In yet another aspect, a non-transitory computer-readable medium is provided, the non-transitory computer-readable medium having stored thereon program instructions executable by at least one processing unit for performing any of the aforementioned methods.

Any of the above features may be used together in any suitable combination.

DESCRIPTION OF THE DRAWINGS

Reference is now made to the accompanying figures in which.

It will be noted that throughout the appended drawings, like features are identified by like reference numerals.

DETAILED DESCRIPTION

Figure 1:
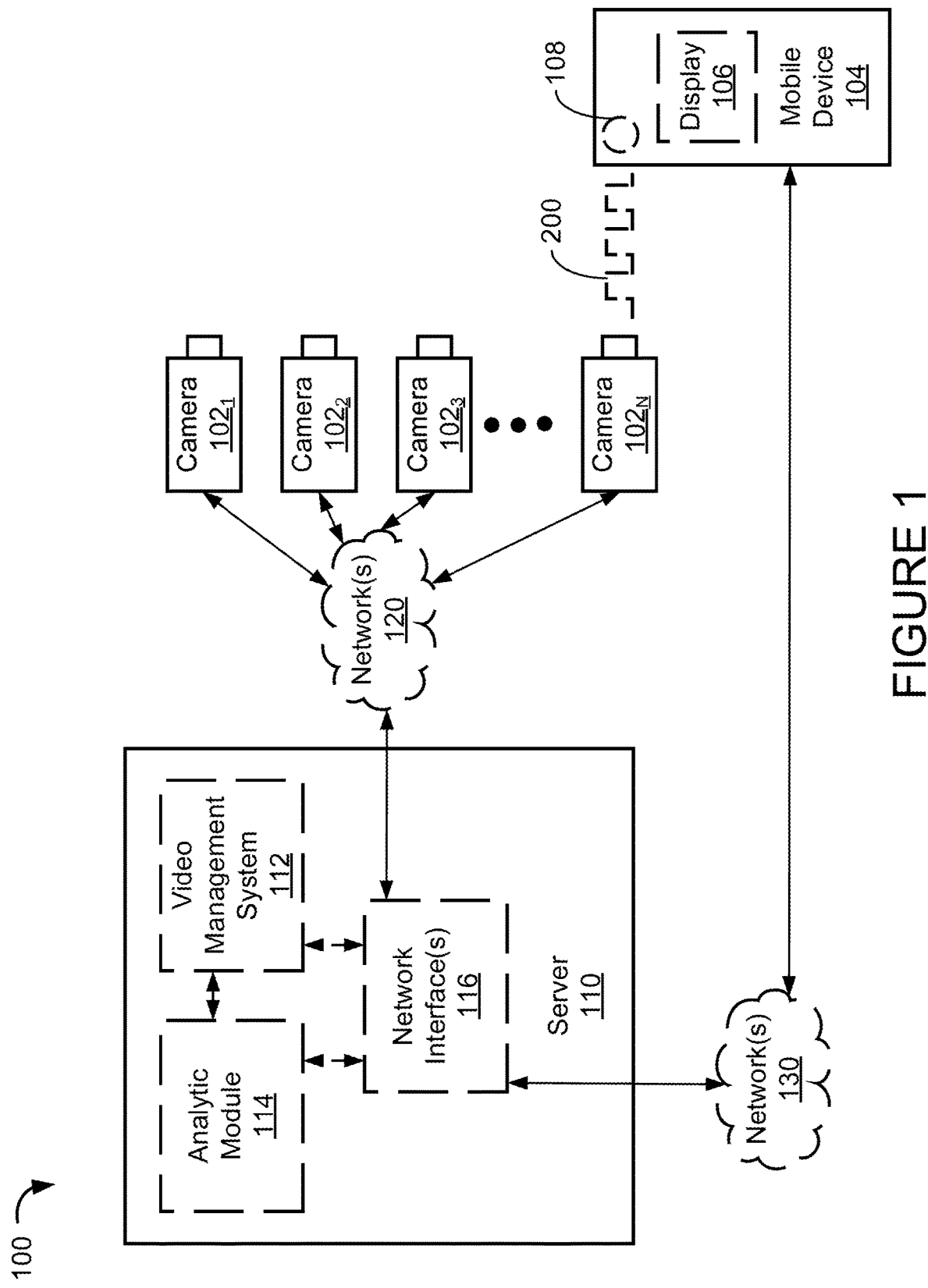
FIG. 1 is a schematic diagram of an example video surveillance environment, in accordance with one or more embodiments.

With reference to FIG. 1, there is illustrated an example of a video surveillance environment 100. The video surveillance environment 100 comprises at least one server 110 and comprises a plurality of video cameras $102_1, 102_2, 102_3, \ldots 102_N$ in communication with the server 110. The video cameras $102_1, 102_2, 102_3, \ldots 102_N$ are collectively referred to as "video cameras 102" and any given one is referred to as "video camera $102_i$". While FIG. 1 illustrates four (4) video cameras $102_1, 102_2, 102_3, 102_N$, this is for illustrative purposes only, and any suitable number of video cameras may be in communication with the server 110.

Each one of the cameras 102 may be any suitable camera for capturing images. The cameras 102 in the video surveillance environment 100 may comprise different types of cameras, different models of cameras, and/or may comprise cameras from different manufacturers. In general, a given camera $102_i$ comprise at least one image sensor (also referred to as an optical sensor). The image sensor, for example, may be in the form of a charge coupled device (CCD), a complementary metal-oxide-semiconductor (CMOS) sensor, or any other suitable sensor for registering incident light. The camera $102_i$ may comprise a lens for collecting incident light. In some embodiments, the image sensor comprises an infrared image sensor. The camera $102_i$ may comprise multiple image sensors. For example, the camera $102_i$ may comprise an image sensor for capturing color images and an image sensor for capturing infrared images. In some embodiments, the camera $102_i$ is an infrared camera. The camera $102_i$ may comprise one or more computing devices and/or any suitable circuitry. For example, the camera $102_i$ may comprise an image/video encoder (implemented in hardware, software, or any combination thereof), a processing unit, a memory, and/or a network interface for connection to one or more networks, such as network(s) 120. The encoder may be arranged to encode captured digital image data into any one of several formats for continuous video sequences, for limited video sequences, for still images or for streamed images/video. For instance, the image information may be encoded into MPEG1, MPEG2, MPEG4, H.264, H.265, JPEG, M-JPEG, bitmapped, or into any other suitable format. Accordingly, each camera $102_i$ is configured to obtain one or more images based on image information captured by the image sensor. Each camera $102_i$ is configured to transmit video data comprising the one or more captured images to the server 110. One or more of the cameras 102 may be an Internet Protocol (IP) camera. Accordingly, one or more of the cameras 102 may transmit video data using Transmission Control Protocol/Internet Protocol (TCP/IP) protocol to the server 110. In some embodiments, the video data may be transmitted in real-time or near real-time from the cameras 102 to the server 110. In some embodiments, the video data may be stored at a storage device of a given camera $102_i$ or at a storage device connected to a given camera $102_i$. In other words, in some embodiments, one or more of the cameras 102 may implement edge recording. The video data stored at a given camera $102_i$ may be provided to the server 110 at a later time. The video data comprising a plurality of images from a given camera $102_i$ may be referred to as a video stream. Accordingly, each one of the video cameras 102 may provide at least one respective video stream to the server 110. An image or images of a given video stream may be referred to as a "frame" or as "frames", respectively. In other words, a video stream may be referred to as comprises a plurality of frames. In some embodiments, one or more of the cameras 102 may provide multiple video streams to the server 110, depending on the configurations of the cameras 102. The configuration and/or the components of each one of the cameras 102 may vary.

The server 110 may be any suitable computing device(s), such as one or more computers, a server clusters, a mainframe, a computing cluster, a cloud computing system, a distributed computing system, a portable computing device, or the like. While reference is made herein to "a server" or to "the server", it should be understood that one or more servers may be used to implement the embodiments and/or examples described herein. The server 110 may be a back-end server. The server 110 is configured to receive video data from video cameras 102 connected to the server 110. The video data from a given video camera $102_i$ corresponds to at least one video stream of images captured by that video camera $102_i$. The video cameras 102 may communicate with the server 110 by use of one or more wires, such as one or more network cables, by use of any suitable network equipment, and/or by wireless communication. The cameras 102 may communicate with the server 110 using one or more networks 120. The network(s) 120 may comprise one or more public networks (e.g., the Internet) and/or one or more private networks. The network(s) 120 may comprise one or more of a personal area network (PAN), local area network (LAN), mesh network, metropolitan area network (MAN), wide area network (WAN), wireless network, Wi-Fi network, cellular network and/or any other suitable network(s).

The server 110 may be or may comprise an archiver for archiving the video data. The server 110 may manage the cameras 102, provide a workstation environment, for example, for live view of the video streams or for controlling cameras 102, and/or provide or control access to camera streams by remote workstation(s). The server 110 may provide a video management system (VMS) 112, which may provide any of the described functions of the server 110. The VMS 112 may be a software application running on the server 110 and which provides video management services. The VMS 112 may receive the video data from the cameras 102, may store the video data to a storage device and/or provide an interface to both view a live video stream provided by the video data of a given camera $102_i$, and access stored video data. The VMS 112 may be implemented by Security Center provided by Genetec Inc. In some embodiments, the VMS 112 is at least one separate computing device connected to the server 110, such as one or more computers, a server clusters, a mainframe, a computing cluster, a cloud computing system, a distributed computing system, a portable computing device, or the like.

One or more mobile devices, such as mobile device 104 of FIG. 1, may be configured to interact with the video surveillance environment 100 via the server 110. The mobile device 104 may be able to connect to the VMS 112, for example, in order to view one or more live video stream provided by the cameras 102 and/or to access stored video stream(s). The mobile device 104 may be any suitable portable computing device, such as a mobile phone, a smart phone, a tablet, a laptop computer, a smart watch, or the like. The mobile device 104 may run a mobile application configured to allow the mobile device 104 to communicate with the server 110 (e.g., VMS 112). The mobile device 104 may have any suitable network interface for connecting to a network, such as network(s) 130. The mobile device 104 may communicate with the server 110 by use of one or more wires, such as one or more network cables, by use of any suitable network equipment, and/or by wireless communication. The mobile device 104 may communicate with the server 110 over one or more networks 130. The network(s) 130 may comprise one or more public networks (e.g., the Internet) and/or one or more private networks. The network(s) 130 may comprise one or more of a PAN, MAN, LAN, WAN, mesh network, wireless network, W-Fi network, cellular network and/or any other suitable network(s). The network(s) 130 may comprise some or all of the network(s) 120. In some embodiments, the network(s) 130 may be the same as the network(s) 120. In some embodiments, the network(s) 130 may be different from the network(s) 120.

The server 110 may comprise one or more network interfaces 116 for communicating with the cameras 102 and/or the mobile device 104. The network interface(s) 116 may be for connection to one or more networks, such as network(s) 120 and/or network(s) 130. The network interface(s) 116 may be implemented in hardware, software, or a combination thereof. In some embodiments, the network interface(s) 116 for the cameras 102 is separate from the network interface(s) 116 for the mobile device 104. The network interface(s) 116 may provide an interface between the cameras 102 and the VMS 112. The network interface(s) 116 may provide an interface between the mobile device 104 and the VMS 112. In some embodiments, the server 110 comprises an analytics module 114, which may be a software application running on the server 110 and which provides video content analytics (VCA). The network interface(s) 116 may provide an interface between the mobile device 104 and the analytics module 114, such that in some embodiments the mobile device is able to communicate with the analytics module 114.

In the example illustrated in FIG. 1, camera $102_N$ is a camera that a user desires to know the identity thereof. The user may hold the mobile device 104 in front of camera $102_N$, while having the mobile device 104 output a visual identifier, which in this example is a flashing light pattern 200. In this example, the visual identifier is indicative of a request to identify the camera(s) capturing the visual identifier. When the visual identifier is captured by a single camera $102_N$, the visual identifier may act as a unique identifier in the video stream of camera $102_N$, which can be used to identify camera $102_N$. In the illustrated example, camera $102_N$ captures the visual identifier and the captured visual identifier is conveyed by a video stream of camera $102_N$ to the server 110. The server 110 is configured to be able to search for the visual identifier in the video streams provided from the video cameras 102 for the purpose of detecting the visual identifier in the video stream from camera $102_N$ and identifying video camera $102_N$ as the camera capturing the visual identifier. The server 110 is able to search for the visual identifier in the video streams, as the server 110 has information on the visual identifier that is being outputted by the mobile device 104. Accordingly, information on the visual identifier that the server 110 expects to be in at least one video stream may be referred to as an "expected visual identifier". While examples described herein are explained by identifying camera $102_N$, this is for example/illustrative purposes and any one or more cameras may be identified according to the embodiments and/or examples described herein.

The mobile device 110 may output the visual identifier by emitting the visual identifier in any suitable manner. The visual identifier may be outputted by a controllable light source 108 of the mobile device 110. The light source 108 is controllable as the mobile device 110 (or an application running thereon) is able to control the light outputted by the light source 108. The light source 108 may be one or more light-emitting diode (LED) lights or any other suitable controllable light source of the mobile device 110. In some embodiments, the visual identifier is time varying over a period of time. The visual identifier may be a visual pattern that changes with time. The visual identifier may be a periodic signal that completes a pattern over a period of time and repeats the pattern one or more times over subsequent period(s) of time. In some embodiments, the visual identifier is the flashing light pattern 200. Accordingly, in some embodiments, the mobile device 104 outputs the flashing light pattern 200 with the light source 108. Accordingly, the server 110 may be configured to search for the flashing light pattern 200 in the video streams and to detect the flashing light pattern 200 in one or more of the video streams.

The visual identifier may be outputted by a display 106 of the mobile device 104. The mobile device 104 may comprise the display 106 or may be connected to the display 106. The display 106, for example, may be a cathode ray tube display screen, a LED display screen, a liquid crystal display (LCD) screen, a touch screen, or any other suitable display device. A larger display, such as on a tablet, may make it possible for the camera $102_N$ to capture images of the visual identifier from a far distance given the larger area for displaying the visual identifier. In some embodiments, the visual identifier is a visual code. The visual code may have encoded therein information indicative that the identity of the camera(s) capturing the visual code is being requested. For example, the server 110 may detect the visual code in one of the video streams, decode the visual code which indicates that the identity of the camera capturing this visual code is being requested. The visual code may have encoded therein identification information (e.g., IP address, user account, etc.) of the mobile device 104 requesting the identity of the camera $102_N$ capturing the visual code in order for the server to be able to identify where to transmit the identification information of the camera $102_N$ capturing the visual code. The visual code may be a one-dimensional linear barcode, for example, such as provided by International Standard ISO/IEC 15417, 15420, 16388, or 16390. The visual code may be a two-dimensional matrix code, for example, such as provided by International Standard ISO/IEC 24778, 16022, or 18004. In some embodiments, the visual code used is a Quick Response (QR) code. In some embodiments, the visual code used is a data matrix code. The visual code may be any other suitable visual code.

In some embodiments, the visual identifier is a visual marker displayed on the display 106. For example, a marker of a certain shape and/or color(s) may be displayed. The marker may vary over a period of time. By way of another example, a specific image may be displayed on the display 106. In some embodiments, the visual identifier is a flashing light pattern outputted by the display 106 of the mobile device 104. The visual identifier may be displayed on the display 106 in any suitable manner. The visual identifier may vary depending on practical implementations.

In the example of FIG. 1, the visual identifier is captured by camera $102_N$ and the video stream from camera $102_N$ comprises one or more images of the visual identifier. When the visual identifier that varies over a period of time (e.g., such as the flashing light pattern 200), the video stream comprises a plurality of images that conveys the visual identifier. The server 110 processes the video streams from the cameras 102 to search for the visual identifier. In this example, the server 110 detect the visual identifier in the video stream from camera $102_N$. In other words, the server 110 identifiers that the video stream from camera $102_N$ has the visual identifier. The server 110 may then identify that camera $102_N$ captured the visual identifier from the identified video stream having the visual identifier, as the server 110 has knowledge of which video streams are from which cameras. The server 110 may then transmit identification information of camera $102_N$ that captured the visual identifier to the mobile device 104. The application running on the mobile device 104 may then notify the user of the identification information. The identification information of a give camera $102_i$ may comprise any one or more of: a unique identifier of the camera $102_i$ (e.g., a unique device identifier), a camera name (e.g., the camera name stored in the VMS 112), an IP address of the camera $102_i$, a MAC address of the camera $102_i$, model number of the camera $102_i$, serial number of the camera $102_i$, login credentials (e.g., username and password) for the camera $102_i$ and/or any other suitable information that identifies the camera $102_i$.

In some embodiments, the analytics module 114 of the server 110 performs at least some of the functionality of server 110 described herein. For example, the analytics module 114 may be configured to search for the visual identifier in the video streams, detect the visual identifier in one or more video streams and/or identify the video camera(s) capturing the visual identifier. By way of example, the mobile device 104 may connect with the server 110 and indicate to the server 110 that the mobile device 104 requests the identification information of a given camera $102_N$. More specifically, the mobile device 104 may connect to the VMS 112 and request the identification information of a given camera $102_N$. The analytics module 114 may receive the video streams from the VMS 112. The VMS 112 may instruct the analytics module 114 to search for an expected visual identifier in the video streams, in response to the request from the mobile device 104. The analytics module 114 may receive the expected visual identifier from the VMS 112. In some embodiments, the analytics module 114 may have the expected visual identifier, which is to be searched for in the video streams. In some embodiments, the mobile device 104 may provide the expected visual identifier to the VMS 112 and/or the analytics module 114. The analytics module 114 may detect the visual identifier in a given video stream, which in this example is the video stream from camera $102_N$. The analytics module 114 may identify the camera $102_N$ that corresponds to the video stream having the visual identifier detected therein. The analytics module 114 may provide the identity of the camera $102_N$ that captured the visual identifier to the VMS 112. Alternatively, the analytics module 114 may provide the identity of the video stream having the visual identifier therein to the VMS 112, and the VMS 112 may determine that camera $102_N$ corresponds to the identified video stream having the visual identifier therein. The VMS 112 may transmit the identification information of the camera $102_N$ capturing the visual identifier to the mobile device 104. Alternatively, the analytics module 114 may provide the identification information of the camera $102_N$ capturing the visual identifier. While the analytics module 114 is illustrated in FIG. 1 as separate from the VMS 112, in some embodiments, the analytics module 114 is implemented as part of the VMS 112. The processing of the video streams received from the cameras 102 by the server 110 (e.g., the analytics module 114) may be performed in real-time, or near real-time, while the visual identifier is being output by the mobile device 104. This may allow for the identification information of the camera $102_N$ capturing the visual identifier to be transmitted back to the mobile device 104 in real-time, or near real-time, while the visual identifier is being output.

It should be appreciated that by having a mobile device output a visual identifier (e.g., a flashing light pattern) in front of a camera and by having a server identify the video camera capturing the visual identifier and convey to the mobile device which camera captured the visual identifier, that this may simply the task of identifying a camera amongst many cameras. In particular, this may allow the operator to identify a camera while being a distance away from that camera (i.e., while not physically accessing the camera), for example. By way of another example, non-specialized makes and/or models of cameras may be used in the video surveillance environment 100 (i.e., specialized cameras with identification functionality may be omitted from the video surveillance environment 100). Furthermore, this may allow an operator to easily obtain the identity of a camera amongst many while the operator is in the vicinity of the camera that the operator desires to know the identity thereof.

In some embodiments, one or more of the cameras 102 may be configured to perform the detection of the visual identifier. For example, a given camera $102_i$ may be implemented with an analytics module, which may be similar to the analytics module 114 and may implement any of the functionally of the analytics module 114 that is described herein. In general, a given camera $102_i$ may be configured to search for an expected visual identifier (e.g., an expected flashing light pattern) in the video stream that camera $102_i$ generates, and when the camera $102_i$ detects the visual identifier in that camera's video stream, then the camera $102_i$ transmits an indication to the server 110 that the visual identifier has been detected by that camera $102_i$. For example, the camera $102_i$ may encode in its video stream the indication and the server 110 may be configured to search for that type of indication in the video streams from the cameras 102. The server 110 may then identify which camera captured the visual identifier, as the server 110 knows which video streams are from which cameras. By way of another example, the camera $102_i$ may send a message (separate from its video stream) to the server 110 that it has identified the visual identifier. The server 110 may be configured to transmit to one or more of the cameras 102 the visual identifier to search for (i.e., the expected visual identifier). Alternatively, one or more of the cameras 102 may have the expected visual identifier stored in memory or a storage device. The server 110 may transmit to one or more of the camera 102 the expected visual identifier, for example, in response to an indication from the mobile device 104 that a visual identifier is being output or in response to an indication from the mobile device 104 of the intention to request the identification of at least one video camera. When the server 110 receives from a given camera $104_i$ an indication that that camera $104_i$ detected the visual identifier, the server 110 may then transmit to the mobile device 104 the identification information of that camera $104_i$.

Figure 2:
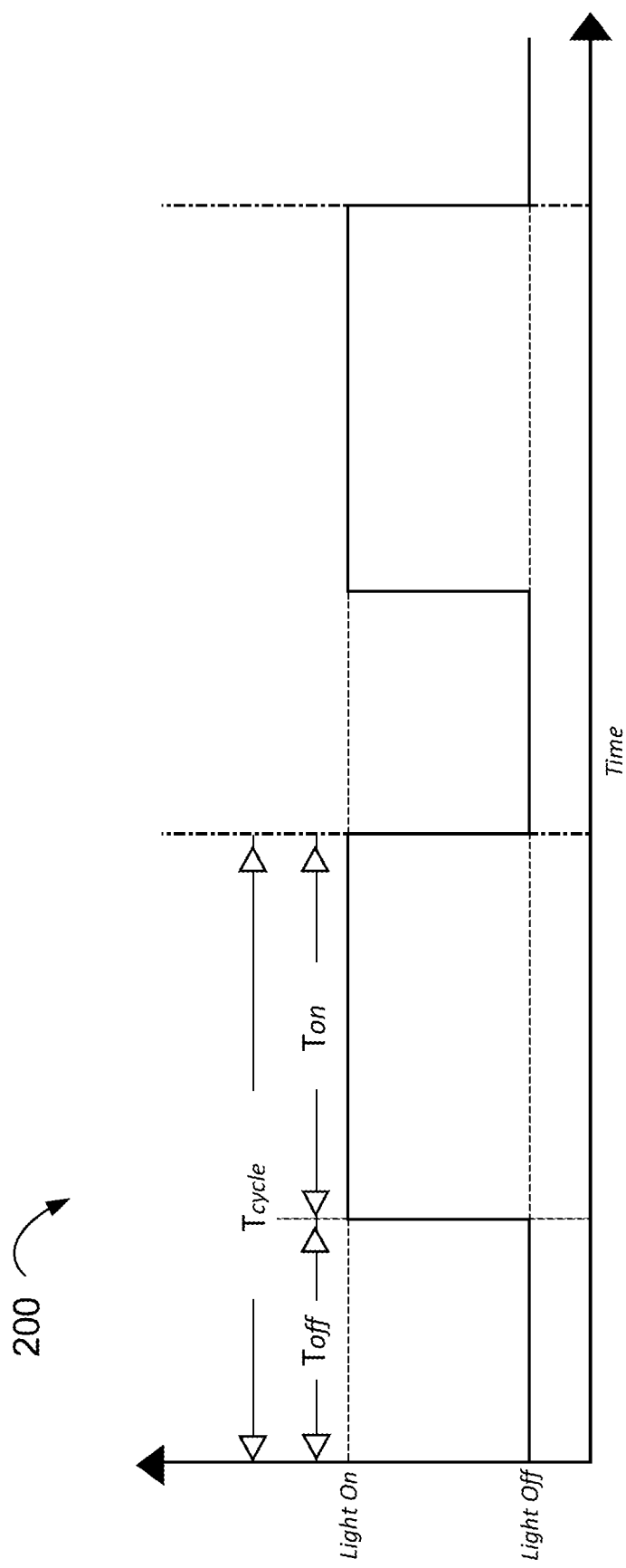
FIG. 2 is a plot of an example flashing light pattern used for identifying a video camera of a video surveillance environment, in accordance with one or more embodiments.

With reference to FIG. 2, a specific and non-limiting example of a flashing light pattern 200 is illustrated. It is desired to design the flashing light pattern 200 in a manner such that it can be correctly identified at the server 110. For instance, if the flashing light pattern 200 changes in time too fast in relation to a frame rate of a given video stream/camera, it may be misinterpreted and may not result in a positive detection. In the example, of FIG. 2, the flashing light pattern 200 is a binary signal that varies between a light being on, shown as "Light On" in FIG. 2, and a light being off, shown as "Light Off" in FIG. 2. The timing for the Light On state and the Light Off state may be set according to the lowest frame rate of all candidate video cameras 102 and/or video streams.

The mobile device 104 may control the controllable light source 108 to cause the mobile device 104 to output the flashing light pattern 200. The mobile device 104 may toggle on and off the controllable light source 108 according to the flashing light pattern 200. The flashing light pattern 200 that is to be output by the mobile device 104 may vary depending on practical implementations. The flashing light pattern 200 may be determined at the server 110, at the mobile device 104, or at a combination thereof. A specific and non-limiting example of a process for determining the flashing light pattern 200 is described below. The frame rates of all candidate video cameras 102 (or video streams) may be obtained. The minimum frame rate may be determined from the frame rates by identifying the smallest frame rate of all candidate frame rates. For example, a minimum frames per second (FPS) configuration of the cameras 102 may be determined from the following equation:

$$FPS_{min} = \min(FPS_1, FPS_2, \ldots, FPS_N), \quad (1)$$

In equation (1), $FPS_{Min}$ corresponds to the minimum frame rate configuration of cameras $102_1$ to $102_N$, $FPS_1$ corresponds to the frame rate configuration of a first camera $102_1$, $FPS_2$ corresponds to the frame rate configuration of a second camera $102_1$, and $FPS_N$ corresponds to the frame rate configuration of a $n^{th}$ camera $102_N$.

In the example of FIG. 2, a total cycle time $T_{cycle}$ of the pattern 200 corresponds to the time of Light On ($T_{on}$) and Light Off ($T_{off}$), and may be determined according to the following equation:

$$T_{cycle} = T_{on} + T_{off}, \quad (2)$$

In equation (2) both $T_{on}$ and $T_{off}$ are set to be at or greater than twice the inverse of $FPS_{Min}$. Both $T_{on}$ and $T_{off}$ are set in this manner in order to capture each light state (i.e., Light On and Light Off) regardless of any synchronization between the flashing light pattern 200 and image capture.

Accordingly, $T_{on}$ and $T_{off}$ may be respectively set according to the following equation:

$$T_{on} \geq \frac{2}{FPS_{min}}, \quad (3)$$

$$T_{off} \geq \frac{2}{FPS_{min}}, \quad (4)$$

Accordingly, $T_{cycle}$ may correspond to the following equation:

$$T_{cycle} \geq \frac{4}{FPS_{min}}, \quad (5)$$

By way of a specific and non-limiting example, if $FPS_{Min}$=10 FPS, then each of $T_{on}$ and $T_{off}$ are set to greater than or equal to 0.2 seconds. This results in pattern generation rate $T_{cycle}$ to be at or at least 0.4 seconds long (or a maximum frequency of 2.5 Hz or less).

In FIG. 2, the flashing light pattern 200 is a pattern with a plurality of Light On states each set with the same time $T_{on}$ and a plurality of Light Off states each set with the same time $T_{off}$. In some embodiments, the flashing light pattern 200 may be more complex than the flashing light pattern 200 shown in FIG. 2. For example, the flashing light pattern 200 may have a plurality of Light On states with one or more different times $T_{on}$ and a plurality of Light On states with one or more different times $T_{off}$. The flashing light pattern 200 may be set in order to convey information to the server 110. For example, the flashing light pattern for a user with one mobile device may be different from the flashing light pattern for a different user with a different mobile device. Accordingly, the flashing light pattern 200 may covey identification information of the mobile device 104 outputting the visual identifier. The flashing light pattern 200 may vary depending on practical implementations.

Figure 3:
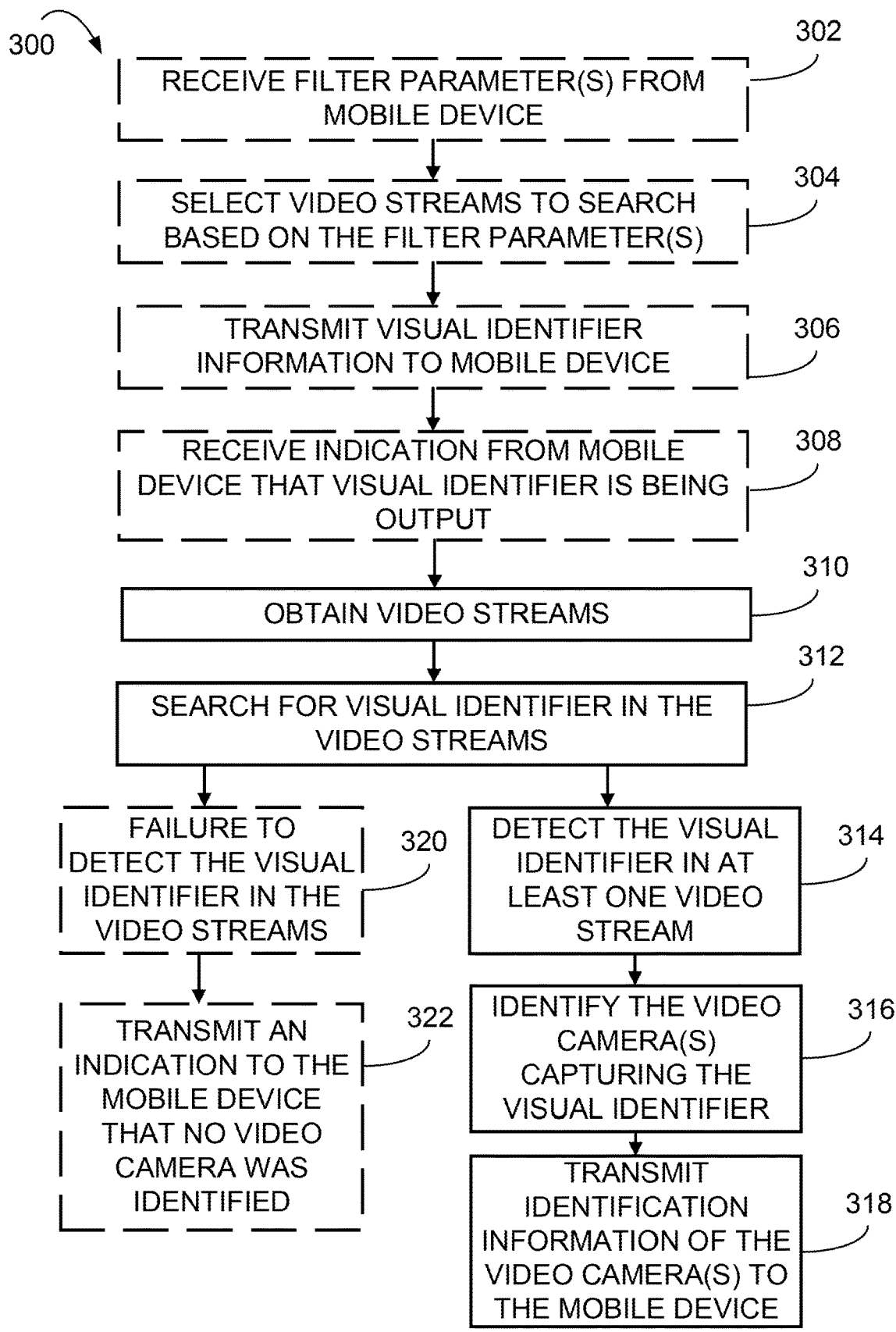
FIG. 3 is a flowchart illustrating an example method performed by at least one server for identifying a video camera of a video surveillance environment, in accordance with one or more embodiments.

With reference to FIG. 3, there is shown a flowchart illustrating an example method 300 for identifying at least one video camera, such as camera 102$_N$. The method 300 is performed by one more servers, such as server 110, or by any other suitable computing device(s) or system(s). The method 300 may be performed at least in part by analytics software application running on at least one server, such as by analytics module 114, and/or may be performed at least in part by a VMS software application running on at least one server, such as VMS 112. The method 300 may be performed after a mobile device, such as mobile device 104, has authenticated with the server 110 (e.g., logged in) and/or has communicated the intention to request the identification of at least one video camera.

In some embodiments, at step 302, one or more filter parameters are received from the mobile device 104. The filter parameter(s) may be used by the server 110 to narrow down which cameras 102 may be capturing the visual identifier. The filter parameter(s) may comprise location information. The location information may be location information of the camera 102$_N$ that identity is requested thereof and/or of the mobile device 104 making the identification request. The location information may comprise geolocation information that identifies or estimates the real-world geographical location of the camera 102$_N$. The geolocation information may comprise global positioning system (GPS) position information of the mobile device 104. The geolocation information may comprise a MAC address and/or IP address of a wireless access point (e.g., a W-Fi router) having a known location that the mobile device 104 is connected thereto. The location information may comprise text indicative of the location of the camera 102$_N$. The location information may be inputted into the mobile device 104 by a user. For example, if the camera 102$_N$ is installed on a known floor, the location information may indicate the floor number. By way of another example, if the camera 102$_N$ is installed in a known room (or place), the location information may indicate the name, number and/or address of the room (or place).

The filter parameter(s) may be received as part of a message received from the mobile device 104, where the message comprises the filter parameter(s) and, optionally, an indication of the intention to request the identification of at least one video camera. In some embodiments, the indication of the intention to request the identification of at least one video camera may be inherent from the message. The message may also comprise a unique identifier of the mobile device 104 or any other suitable identification information for the mobile device 104 (e.g., IP address, MAC address, user account, etc.) making the request. The filter parameter(s) may comprise one or more of a camera name, a camera make, a camera model, a camera firmware version, and/or any other suitable parameter(s). The filter parameter(s) may vary depending on practical implementations and may comprise any kind of suitable virtual and/or physical characteristics that could be used to narrow down the potential search of the video streams.

In some embodiments, at step 304, a plurality of video streams are selected from a set of video streams based on the one or more filter parameters. The set of video streams may correspond to the available video streams at the server 110. The selected plurality of video streams may correspond to a subset of the set of video streams that analysis is to be performed thereon (e.g., to search for the visual identifier). In other words, the selected plurality of video streams may correspond to candidate video streams for further processing. The plurality of video streams may be selected from the set of video streams based on the location information. Accordingly, the selected video streams may correspond to video streams from video cameras within a geographical position of a geolocation conveyed by the location information. For example, the selected video streams may correspond to video streams from video cameras within a geographical position of the GPS position identified in the location information. By way of another example, the selected video streams may correspond to video streams from video cameras on the same floor as a floor identified in the location information. By way of yet another example, the selected video streams may correspond to video streams from video cameras in the same room as a room identified in the location information. It should be appreciated that by reducing the number of video streams for the searching of the visual identifier, that this may reduce the processing power require to identify the visual identifier in a video stream.

The VMS 112 may receive the filter parameter(s), select the video streams that analysis is to be performed thereon, and provide the selected video streams to the analytics module 114 for analysis. Alternatively, the analytics module 114 may select the video streams that analysis is the be performed thereon from the received filter parameter(s).

In some embodiments, at step 306, visual identifier information is transmitted to the mobile device 104. In some embodiments, the visual identifier information corresponds to the visual identifier that the mobile device 104 is to output. In some embodiments, the visual identifier information corresponds to information that allows the mobile device 104 to generate the visual identifier. In some embodiments, the visual identifier information is timing information for generating the visual identifier that varies over a period of time.

The visual identifier information may be timing information for the flashing light pattern 200. In some embodiments, the timing information comprises the minimum frame rate configuration $FPS_{min}$ of the cameras 102. The minimum frame rate configuration $FPS_{min}$ may be determined by the server 110 (e.g., VMS 112) and provided to the mobile device 104 for the mobile device 104 to generate the flashing light pattern 200 therefrom. In some embodiments, the timing information comprises a maximum frequency for the flashing light pattern 200. The maximum frequency for the flashing light pattern 200 may be determined at the server 110 based on the minimum frame rate configuration $FPS_{min}$. More specifically, the maximum frequency for the flashing light pattern 200 may correspond to the minimum frame rate configuration $FPS_{min}$ divided by four (4). In other words, the maximum frequency for the flashing light pattern 200 may correspond to the inverse of the total cycle time $T_{cycle}$ of the pattern 200. In some embodiments, the timing information may comprise the light on time $T_{on}$ and the light off time $T_{off}$, where the light on time $T_{on}$ corresponds to the amount of time that the light is to be on in the flashing light pattern 200 and the light off time $T_{off}$ correspond to the amount of time that the light is to be off in the flashing light pattern 200. In some embodiments, the timing information comprises a ratio of a light on time $T_{on}$ to a light off time $T_{off}$. In some embodiments, the timing information corresponds to the flashing light pattern 200 that the mobile device 104 is to output. The server 110 may perform the calculations, for example using one or more of equations (1) to (5), to generate the timing information. The timing information (or visual identifier information) may be used by the server 110 to determine the expected flashing light pattern or may correspond to expected flashing light pattern.

The visual identifier information may correspond to the visual code and/or visual marker or may correspond to information for generating the visual code and/or visual markers at the mobile device 104.

The VMS 112 may provide the visual identifier information to the mobile device 104. For example, after the server 110 receives the indication of the intention to request the identification of at least one video camera from the mobile device 104, the server 110 (e.g., VMS 112) may generate unique visual identifier information (e.g., a unique visual identifier) for that mobile device 104 and/or for that given request from the mobile device 104. By providing the visual identifier information to the mobile device 104, this may allow the server 110 to provide different visual identifier information to different mobile devices in the video surveillance environment 100, which may allow multiple mobile devices to request identification of cameras with different visual identifiers without interference.

In some embodiments, at step 308, an indication that a visual identifier is being output is received from the mobile device 104. In some embodiments, the indication that the visual identifier is being output may be received as part of a message from the mobile device 104. The message may comprise visual identifier information indicative of the visual identifier being output. For example, the mobile device 104 may provide an indication of the visual identifier that is being output to the server 110 in embodiments where the server 110 does not have knowledge of the visual identifier being output by the mobile device 104.

The VMS 112 may receive the indication that the visual identifier is being output from the mobile device 104 and then instruct the analytics module 114 to perform the search for the visual identifier at step 312 (discussed below).

At step 310, a plurality of video streams of a plurality of video cameras 102 are obtained. At least one video camera of the plurality of video cameras 102 captures the visual identifier outputted by the mobile device 104. In the example described in relation to method 300, camera $102_N$ captures the visual identifier. The video streams are obtained from a plurality of video cameras 102. The plurality of video streams may be obtained directly or indirectly from the video cameras 102. The video streams may be obtained in real-time or near real-time from the video cameras 102. The video streams may be obtained from a storage device having stored therein the video streams. The video streams may be obtained by the VMS 112 and/or the analytics module 114. The video streams of the cameras 102 may be obtained in any suitable manner.

Step 312 comprises searching for the visual identifier in the plurality of video streams. The searching for the visual identifier in the plurality of video streams may be performed in response to receiving the indication that the visual identifier is being output at step 308. In some embodiments, searching for the visual identifier comprises searching for the flashing light pattern 200 in the video streams. Any suitable computer vision algorithm may be used to search for the visual identifier. In some embodiments, such as when the visual identifier is varying over a period of time, searching for the visual identifier may comprise processing images of the video streams over a time frame corresponding to the period of time. Some or all of the images over the period of time may be processed. Accordingly, discrete or individual ones of the images (or frames) of the video streams may be processed. The analytics module 114 may perform the search for the visual identifier. For example, the analytics module 114 may perform a pattern recognition algorithm and/or computer vision algorithm on the video streams in order to search for the flashing light pattern 300. In some embodiments, searching for the flashing light pattern in the plurality of video streams comprises identifying light features in the video streams and comparing the light features to an expected flashing light pattern (i.e., the flashing light pattern that is expected to be in at least one video stream).

For example, in some embodiments, each image in a given video stream is analyzed with a computer vision algorithm, which performs features extraction in order to detect one or more light features present in each image. Any suitable algorithm may be used for feature extraction, such as, SURF (Speeded-Up Robust Features), OBR (Oriented FAST and Rotated BRIEF), SIFT (Scale-Invariant Feature Transform), BRIEF (Binary Robust Independent Elementary Features), etc. The computer vision algorithm used may determine an image gradient for each image, and a given image gradient may be processed to identify the light feature(s) in the corresponding image. Regardless of the specific technique used, the computer vision algorithm may be used to identify the light features in a given video stream. The computer vision algorithm may compute feature vectors for each image, where a given feature vector represents the light features in a given image. The feature vectors for a given video stream may be processed to determine if the light features conveyed by the feature vectors corresponds to the expected flashing light pattern.

In some embodiments, machine learning may be used for searching for the visual identifier at step 312. For example, one or more machine learning models may be trained to recognize images with lights pointed towards a camera and/or a flashing light pattern in a video stream. The training model may then be used to search for the visual identifier in the video streams. Accordingly, in some embodiments, a trained machine learning model may receive as input the video streams and output an indicator of the video stream(s) having the visual identifier.

In some embodiments, searching for the visual identifier comprises searching for the visual code in the video streams. In some embodiments, searching for the visual identifier comprises searching for visual marker in the video streams. For example, the server 110 (e.g., analytics module 114) may be configured to search for visual codes and/or visual markers of a certain type. For example, the server 110 (e.g., analytics module 114) may be configured to search for a QR code.

It should be understood that based on the filter parameter(s) received at step 302, that some video streams available at the server 110 may be excluded from the search for the visual identifier. In some embodiments, searching stops when the visual identifier is found in one of the video streams. Alternatively, searching for the visual identifier does not stop when the visual identifier is found.

Step 314 comprises detecting the visual identifier in at least one video stream of the plurality of video streams. The visual identifier is detected based on the searching for the visual identifier at step 312. In some embodiments, such as when the visual identifier is varying over a period of time, detecting the visual identifier comprises processing images of the at least one video stream over a time frame corresponding to the period of time. Some or all of the images over the period of time may be processed. Accordingly, discrete or individual ones of the images (or frames) may be processed. In some embodiments, detecting the visual identifier in at least one video stream comprises detecting the flashing light pattern 200 in at least one video stream. Detecting the flashing light pattern may comprise identifying the at least on video stream having light features corresponding to the expected flashing light pattern. In other words, in some embodiments, when the light features of a given video stream correspond to the expected flashing light pattern, the flashing light pattern 200 is detected in that video stream. The light features may correspond to the expected flashing light pattern when light features are found to match with the expected flashing light pattern within a certain level of certainty (e.g., 95%, 90%, 85%, etc.). The determined level of certainty of the match may be compared to a threshold (e.g., 95%, 90%, 85%, etc.) and detection occurs when the level of certainty exceeds the threshold.

In some embodiments, searching for the flashing light pattern 200 at step 312 comprises processing each video stream to determine if any flashing light patterns are present. The present flashing light patterns detected in the video stream(s) at step 312 may be compared to the expected flashing light pattern at step 312 or 314. When a present flashing light pattern corresponds to the expected flashing light pattern, then the flashing light pattern may be detected in the video stream(s) having the present flashing light pattern corresponding to the expected flashing light pattern, at step 314. A level of certainty for the match between the present flashing light pattern and the expected flashing light pattern may be determined, the level of certainty may be compared to a threshold, and detection occurs when the level of certainty exceeds the threshold.

In some embodiments, the detected visual identifier (e.g., the detected flashing light pattern) may convey identification information of the mobile device 104 outputting the visual identifier (e.g., the flashing light pattern 200), and the identification information may be obtained from the detected visual identifier (e.g., the detected flashing light pattern).

In some embodiments, detecting the visual identifier in at least one video stream comprises detecting the visual code in at least one video stream. In some embodiments, detecting the visual identifier in at least one video stream comprises detecting the visual marker in at least one video stream. For example, the server 110 (e.g., analytics module 114) may be configured to detect a visual codes and/or visual markers of a certain type when present in any of the video streams. The visual codes and/or visual markers may convey identification information of the mobile device 104 outputting the visual codes and/or visual markers.

In some embodiments, steps 312 and 314 may be combined.

Step 316 comprises identifying the at least one video camera $102_N$ capturing the visual identifier from the at least one video stream having the visual identifier detected therein. When the visual identifier is detected in a given video stream, the identity of the camera $102_N$ that captured that video stream may be identified. For example, each video stream may have a unique identifier, which distinguishes the video streams from each other. The unique identifier may be a device identifier that may be indicative of which camera captured the visual identifier. The identification information of the camera $102_N$ that corresponds to this unique identifier may then be obtained. For example, the VMS 112 may store records of the unique identifiers of the cameras 102 and associated identification information of the cameras 102. Accordingly, from the unique identifier obtained from the video stream having the visual identifier detected therein, the identification information of the camera $102_N$ that captured the visual identifier may be obtained.

In some embodiments, in response to identifying the at least one video camera $102_N$ capturing the visual identifier at step 316, an indication that the at least one video camera $102_N$ capturing the visual identifier is stored in computer-readable memory or in at least one storage device. For example, a record of which camera(s) $102_N$ captured the visual identifier and the time that the visual identifier was captured is recorded at the server 110. The server 110 may comprise the storage device or the storage device may be external from the server 110, and in the latter case, the server 110 may cause the indication or record to be stored in the external storage device. In some embodiments, in response to identifying the at least one video camera $102_N$ capturing the visual identifier at step 316, identification information of the at least one video camera $102_N$ capturing the visual identifier is outputted to a display device (e.g., a display device connected to the server 110, a display device connected to a workstation connected to the server 110, etc.).

Step 318 comprises transmitting identification information of the at least one video camera $102_N$ capturing the visual identifier to the mobile device 104. The server 110 may know the identification information of the mobile device 104 from a previous communication with the mobile device 104, in order to know which mobile device to transmit the identification information of the camera $102_N$ thereto. In some embodiments, the identification information of the mobile device 104 may be obtained from the visual identifier. Step 318 may be omitted in some embodiments.

The analytics module 114 may provide the unique identifier to the VMS 112, which then obtains the identification information of the camera 102$_N$ that captured the visual identifier. The VMS 112 may then provide the identification information to the mobile device 104.

In some embodiments, at step 320, the method 300 comprises failing to detect the visual identifier in any one of the video streams from the plurality of cameras 102. In this case, steps 314 and 316 do not occur. In some embodiments, at step 322, an indication that no video camera was identified is transmitted to the mobile device 104, in response to failing to detect the visual identifier at step 320. In this case, step 318 does not occur.

The order or the steps of method 300 may vary depending on practical implementations. For example, step 310 may occur anywhere in the method 300 prior to step 312. By way of another example, step 306 may occur prior to 302. Other variants in the order of the steps are contemplated. Similarly, some of the steps may be combined. For example, steps 302 and 308 may be combined. By way of another example, any ones of steps 312, 314 and 316 may be combined. Other variants in the combination of steps are contemplated.

The method 300 may be performed in real-time, or near real-time, while a camera 102$_i$ captures the visual identifier (e.g., the flashing light pattern 200), shortly thereafter or any other suitable time. For example, the method 300 may be performed in real-time, or near real-time, while a user holds the mobile device 104 in front of one or more cameras and the mobile device 104 outputs the visual identifier. Alternatively, or additionally thereto, the method 400 may be performed at any suitable time after a camera 102$_i$ captures the visual identifier. For example, the user may hold the mobile device 104 in front of one or more cameras and have the mobile device 104 output the visual identifier, then the user may return to the server 110, or to a workstation connected to the server 110, or use the mobile device 104, to request that the server 110 perform the method 300. In this example, the user may input the time or the approximate time that the visual identifier was outputted, and the server 110 may then perform the method 300 and search for the visual identifier in the video streams around the time provided by the user. If the user returns to the server 110, or to a workstation connected to the server 110, then the identification information of the camera capturing the visual identifier may be output on a display device connected to the server 110 or the workstation 110. In some cases, the user may walk around to multiple cameras and have these cameras capture the visual identifier, and then afterwards request that the server 110 perform the method 300 to identify all of these cameras.

Figure 4:
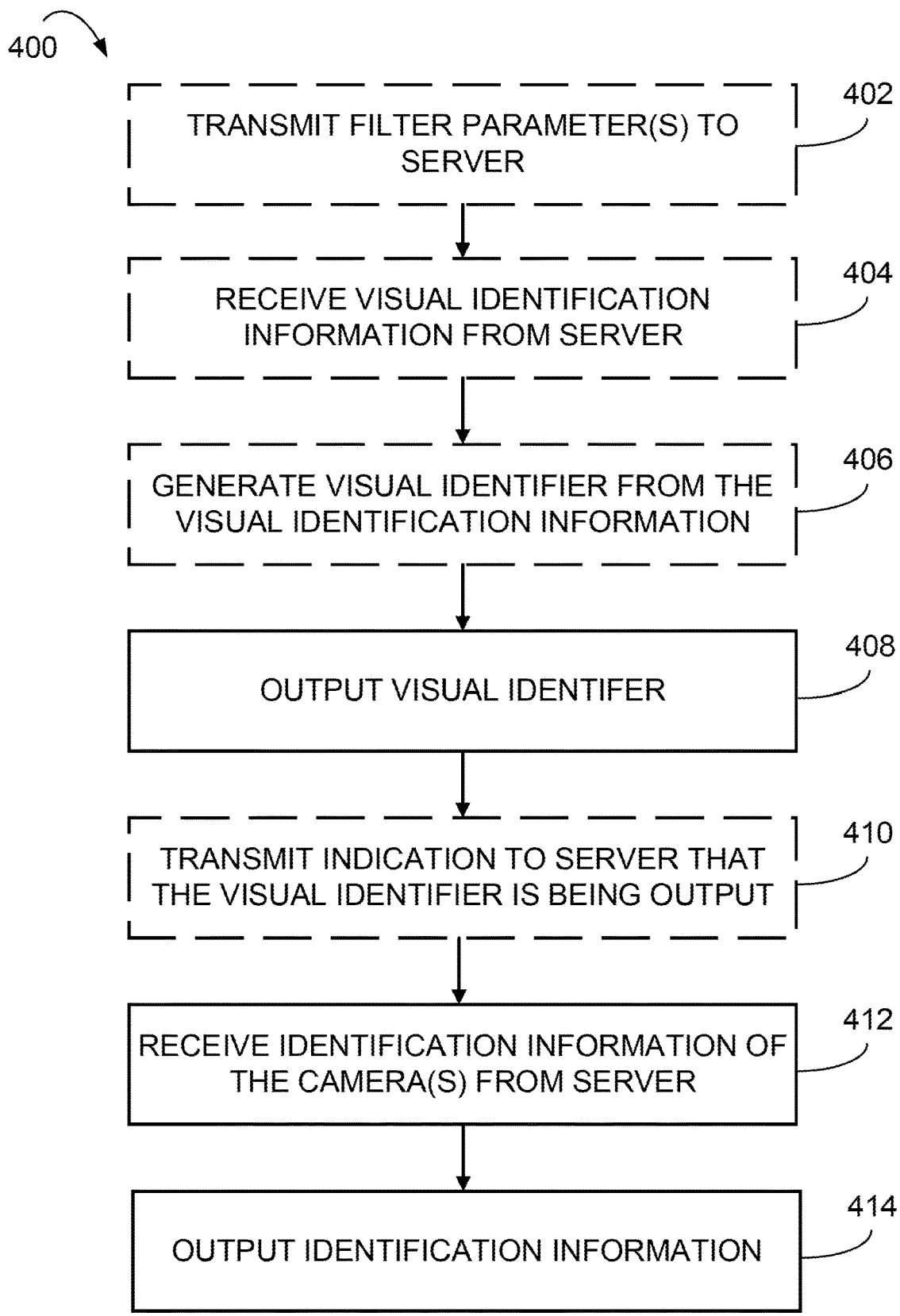
FIG. 4 is a flowchart illustrating an example method performed by a mobile device for identifying a video camera of a video surveillance environment, in accordance with one or more embodiments.

With reference to FIG. 4, there is shown a flowchart illustrating an example method 400 for identifying at least one video camera, such as camera 102$_N$. The method 400 is performed by a mobile device, such as mobile device 104. The method 400 may be performed by a mobile application running on the mobile device 104. The method 400 may be performed after a mobile device, such as mobile device 104, has authenticated with the server 110 (e.g., logged in) and/or has communicated the intention to request the identification of at least one video camera, such as camera 102$_N$. For example, a user may open the mobile application running on the mobile device 104 for interfacing with the VMS 112 and may indicate via the application the intention to request the identification of at least one video camera.

In some embodiments, at step 402, one or more filter parameters are transmitted to the server 110. The filter parameter(s) may be as described elsewhere in this document, for example, as described in relation to step 302 of method 300. The mobile device 104 may obtain the filter parameter from a user interacting with the mobile device 104. For example, the user may input in the filter parameter(s), such as the location information, via an input device (e.g., a touch screen, a graphical user interface (GUI), a keyboard, a mouse, a stylus, or the like). The mobile device 104 may obtain the filter parameter(s) automatically. The geolocation position information may be obtained automatically. For example the GPS position information may be obtained from a GPS unit of the mobile device 104. By way of another example, geolocation position information may be obtained from a wireless access point that the mobile device 104 is connected thereto. By way of yet another example, a filter parameter may be obtained by the mobile device 104 from a near-field communication (NFC) beacon or a Bluetooth beacon, which the geophysical location may be known. The filter parameter(s) may be transmitted to the server 110 as part of a message that comprises the filter parameter(s) and, optionally, an indication of the intention to request the identification of at least one video camera 102$_N$. The message may also comprise a unique identifier and/or identification information for the mobile device 104 (e.g., IP address, MAC address, user account, etc.) making the request.

In some embodiments, at step 404, visual identification information is received from the server 110. The visual identification information may be as described elsewhere in this document, for example, as described in relation to step 306 of method 300. Receiving the visual identification information may comprise receiving the timing information, for example, for the flashing light pattern 200, or visual information for the visual code or the visual marker.

In some embodiments, at step 406, a visual identifier is generated based on the visual identification information received from the server 110. In some embodiments, the visual identifier is generated based on the timing information. In some embodiments, the visual identifier is the flashing light pattern 200, and the flashing light pattern 200 is generated based on the timing information. In some embodiments, the timing information comprises the minimum frame rate configuration FPS$_{min}$ of the cameras 102, and the mobile device 104 generates the flashing light pattern 200 based on the minimum frame rate configuration FPS$_{min}$. For example, the mobile device 104 may determine the minimum light on time T$_{on}$ and light off time T$_{off}$ from the minimum frame rate configuration FPS$_{min}$ according to equations (3) and (4). The flashing light pattern 200 may be generated from the light on time T$_{on}$ and light off time T$_{off}$. In some embodiments, the timing information comprises the maximum frequency for the flashing light pattern 200, and the mobile device 104 generates the flashing light pattern 200 based on the maximum frequency. That is, the mobile device 104 may generate the flashing light pattern 200 in order to not exceed the maximum frequency. To generate the flashing light pattern 200, the mobile device 104 may determine the total cycle time T$_{cycle}$ of the pattern 200 from the inverse of the maximum frequency, and, from the total cycle time T$_{cycle}$, determine the minimum light on time T$_{on}$ and light off time T$_{off}$ according to equations (2) to (5). In some embodiments, the timing information comprises the light on time T$_{on}$ and light off time T$_{off}$ or a ratio of the light on time T$_{on}$ and light off time T$_{off}$. The server 110 may generate the visual identifier (and/or the expected visual identifier), for example, in a manner similar to that described above. The server 110 may provide the visual identifier to the mobile device 104 as part of the visual identification information at step 404. In such case, the mobile device 104 may obtain the visual identifier from the server 110 (e.g., from the visual identification information), and the mobile device 104 may then output the received visual identifier.

In some embodiments, at step 406, a visual code or a visual marker is generated based on the visual identification information received from the server 110.

In alternative embodiments, the visual identifier may be generated at the mobile device 104 based on prestored information. For example, the mobile device 104 may have the minimum frame rate $FPS_{min}$ stored therein, and may generate the flashing light pattern 200 based on the minimum frame rate $FPS_{min}$. By way of another example, the mobile device 104 may have the light on time $T_{on}$ and light off time $T_{off}$ stored therein, and may generate the flashing light pattern 200 based on the light on time $T_{on}$ and light off time $T_{off}$. By way of yet another example, the mobile device 104 may have the maximum frequency for the flashing light pattern 200, and may generate the flashing light pattern based on the maximum frequency. In some embodiments, the visual identifier itself may be prestored at the mobile device 104. Accordingly, the visual identifier may be obtained from computer readable memory and/or a storage device of the mobile device 104.

Step 408 comprises outputting the visual identifier. At least one camera $102_N$ of the plurality of cameras 102 captures the visual identifier. The visual identifier may be outputted as described elsewhere in this document or by any other suitable manner. Outputting the visual identifier may comprise outputting the flashing light pattern 200 with the controllable light source 108 of the mobile device 104. That is, the mobile device 104 may control the controllable light source 108 to have the flashing light pattern 200 outputted.

In some embodiments, at step 410, an indication that the visual identifier is being outputted is transmitted to the server 110. The indication may be as described elsewhere in this document, for example, as described in relation to step 308 of method 300. In some embodiments, the indication that the visual identifier is being output may be transmitted as part of a message to the server 110. The message may comprise visual identifier information indicative of the visual identifier being output such that the server 110 is informed of the visual identifier to search for. In other words, in some embodiments, the expected visual identifier is transmitted to the server 110, or information is transmitted that allows the server 110 to generate the expected visual identifier.

At step 412, identification information of the at least one camera $102_N$ capturing the visual identifier is received from the server 110. The identification information may be as described elsewhere in this document, for example, as described in relation to step 318 of method 300. In some embodiments, the outputting of the visual identifier is stopped in response to the receipt of the identification information of the camera $102_N$ capturing the visual identifier. In the case that the server 110 fails to detect the visual identifier, an indication that no video camera was identified may be received from the server 110.

At step 414, the identification information is outputted. The identification information may be displayed on the display 106 of the mobile device 104. For example, a unique identifier of the identified camera $102_N$ may be displayed. A camera name for the identified camera $102_N$, such as the camera name stored in the VMS 112, may be displayed. Any one or more of the following for the identified camera $102_N$ may be displayed: an IP address, a MAC address, location information, login credential, configuration information, make, model, and/or firmware version information, and VMS configuration information (e.g., assigned name, location, associated door reader(s), etc.). Any other suitable information for the identified camera $102_N$ may be displayed.

In some embodiments, more than one camera is identified as capturing the visual identifier, and a listing of the multiple cameras that captured the visual identifier may be displayed. The identification of more than one camera would typically happen when the mobile device 104 outputs the visual identifier within multiple camera's fields of view. Identification information for each of the cameras identifier may be displayed. For example, the identification information of all the identified cameras may be displayed. By way of another example, the user may select one of the cameras listed and further information may be displayed for the selected camera.

In the case that the indication that no video camera was identified was received from the server 110, then an indication that no video camera was identified may be displayed.

In some embodiments, the identification information (or the indication that no video camera was identified) may be outputted via speaker of the mobile device 104. The outputting of this information via a speaker may be in alternative to outputting via a display or may be performed concurrently with the display of the identification information.

In some embodiments, the method 400 further comprises obtaining a list of at least some of the plurality of video cameras; associating the at least one video camera capturing the visual identifier in the list; and wherein displaying at step 414 comprises displaying at least in part the list having the at least one video camera capturing the visual identifier identified therein. The list may be obtained from the server 110 or may be obtained from the memory or a storage device of the mobile device 104. The list may include all cameras available in the video surveillance environment or may by a listing of a select cameras (e.g., the list may include cameras identify according to the filter parameters). It should be appreciated that by displaying at least in part the list with the identified camera(s), this may present the association of the identified camera(s) in the list to the user.

The order or the steps of method 400 may vary depending on practical implementations. For example, step 404 may occur prior to step 402. Other variants in the order of the steps are contemplated. Similarly, some of the steps may be combined. For example, steps 402 and 410 may be combined. Other variants in the combination of steps are contemplated.

Figure 5:
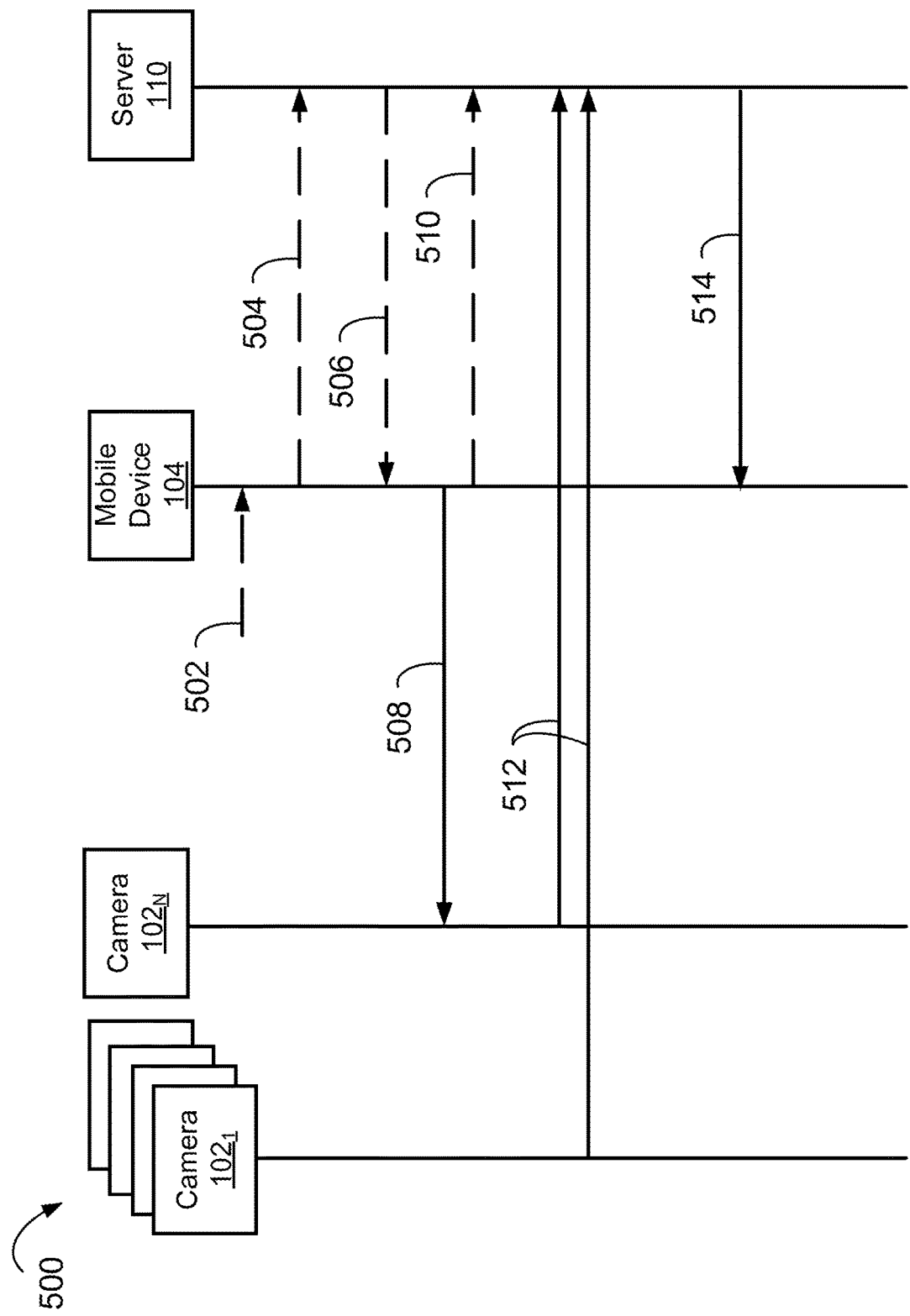
FIG. 5 is signal flow diagram illustrating an example method for identifying a video camera of a video surveillance environment, in accordance with one or more embodiments.

With reference to FIG. 5, there is shown a signal flow diagram illustrating an example method 500 for identifying at least one video camera, such as camera $102_N$, of a video surveillance environment 100.

At step 502, in some embodiments, an indication is received at the mobile device 104 to identify the camera $102_N$ of the video surveillance environment 100. For example, the user may open an application running on mobile device 104 and request the identification of a camera.

At step 504, in some embodiments, the filter parameter(s) are transmitted from the mobile device 104 to the server 110. The filter parameter(s) may be as described elsewhere in this document, for example, as described in relation to step 302 of FIG. 3 and step 402 of FIG. 4.

At step 506, in some embodiments, visual identification information is transmitted from the server 110 to the mobile device 104. The visual identification information may be as described elsewhere in this document, for example, as described in relation to step 306 of FIG. 3 and step 404 of FIG. 4. The server 110 may determine visual identification information based on the filter parameter(s) received at step 504.

At step 508, the mobile device 104, outputs the visual identifier. The mobile device 104 may generate the visual identifier based at least in part on the visual identification information received at step 506. The mobile device 104 may obtain the visual identifier from memory and/or a storage device of the mobile device 104, or may obtain the visual identifier from the server 110. The mobile device 104 may generate the visual identifier based on information stored in memory and/or a storage device of the mobile device 104. The visual identifier may be as described elsewhere in this document. In this example, camera $102_N$ captures the visual identifier.

In some embodiments, at step 510, the mobile device 104, transmits an indication that the visual identifier is being outputted to the server 110. The indication that the visual identifier is being outputted may be as described elsewhere in this document, for example, as described in relation to step 308 of FIG. 3 and step 410 of FIG. 4.

At step 512, the server 110 obtains the video streams from the cameras 102. The server 110 may obtain the video streams as described elsewhere in this document, for example, as described in relation to step 310 of FIG. 3. The server 110 may then search the video streams for the visual identifier, as described elsewhere in this document (e.g., step 312 of FIG. 3). The server 110 may only search select video streams based on the filter parameter(s) received at step 504. The server 110 detects the visual identifier in one of the video streams and identifies the camera $102_N$ associated with the video stream having the visual identifier detected therein.

At step 514, the server 110, transmits the identification information of the camera $102_N$ capturing the visual identifier to the mobile device 104. The server 110 may transmit the identification information of the camera $102_N$ capturing the visual identifier to the mobile device 104 as described elsewhere in this document, for example, as described in relation to step 318 of FIG. 3 and step 412 of FIG. 4. The mobile device 104 then outputs the identification information of the camera $102_N$ capturing the visual identifier. The mobile device 104 may output the identification information as described at step 414 of FIG. 4. The mobile device 104 (e.g., via the application) may be able to obtain a video stream from the server 110 or directly from the camera $102_N$ in order to view real-time or near real-time video of the identifier camera $102_N$ and/or verify that the camera $102_N$ is enrolled and/or configured properly.

In some embodiments, a "non-visual identifier" may be used in place of a "visual identifier" in the embodiments and/or examples described herein. By way of another example, the non-visual identifier may be a sound wave. The mobile device 104 may output the sound wave and a microphone of a given camera $102_i$ may capture the sound wave. The given camera $102_i$ may then encode the sound wave into the audio channel of the video stream provide to the server 110. The server 110 may search for the sound wave in the video streams, detect the sound wave in at least one video stream, and identify the at least one camera capturing the sound wave.

In some embodiments, the visual identifier is an infrared identifier. Accordingly, the term "visual identifier" as used herein refers to any suitable identifier that can be identified by computer vision (or by a computer vision algorithm) in one or more images. In some embodiments, the mobile device 104 comprises an infrared emitter for emitting the infrared identifier. The infrared identifier may vary over a period of time. The infrared identifier may be an infrared light pattern, which may correspond to the flashing light pattern 200 but composed of infrared light. The server 110 may search for the infrared identifier in the video streams, detect the infrared identifier in at least one video stream, and identify the at least one camera capturing the infrared identifier.

While systems and methods for identifying at least one video camera of a video surveillance environment are described herein, these systems and/or methods may be applicable for other purposes. The systems and methods may accordingly be modified (if needed) to be applicable for these other purposes.

For example, a user with the mobile device 104 may be able to trigger the display of the visual identifier in order to have an event logged at the server 110. Accordingly, step 318 may be omitted from method 300 and steps 412 and 414 of method 400 may be omitted. Thus, the systems and methods may be for logging of events occurring in front of at least one camera $102_N$.

By way of another example, a guard performing a guard tour on a secure premise may simply trigger the visual identifier on his/her mobile device 104 to automatically "check-in" at pre-defined locations that have a video camera. This may replace card readers or location tags often used to track guard tours. This would leverage existing video surveillance infrastructure without possibly the need for any additional hardware.

By way of yet another example, in some embodiments, the mobile device 104 may be an infrared emitter (e.g., a tag, a badge, etc.) that is worn or carried by a user (e.g., a security guard, employee, etc.). The infrared emitter may continuously emit the infrared light pattern and may be tracked by the server 110. That is, as the infrared light pattern of infrared emitter is captured by a given camera, the date/time of the capture may be recorded along with the location. Thus, any person wearing such infrared emitter may be automatically tracked at the server 100. Multiple users may be wearing infrared emitters, where each of the infrared emitters emits a different infrared light pattern, in order for the server 110 to track multiple persons.

The systems and/or methods described herein may be applicable to system and/or methods for tracking of a person (e.g., such as a security guard). For example, video streams of the video cameras 102 may be obtained, where the video cameras capture a flashing light pattern (e.g., infrared light pattern) outputted by a mobile device (e.g., the mobile device 104, or a tag, a badge, etc. worn by the user) as the user with the mobile devices passes within sight of each video camera. The flashing light pattern may be detected in the video streams from these cameras. A new video stream may be generated by combining the video streams having the flashing light pattern detected therein. That is, the new video stream would correspond to a video stream capturing the person being tracked by multiple cameras. At any given time, the camera capturing the flashing light pattern may be identified and then the location of the camera may be identified. Accordingly, the location of the user may be tracked in real-time, or near real-time, as the user passes within sight of the video cameras in the video surveillance environment with the flashing light pattern being emitted. A path of the user may be created in memory or a storage device, where the path comprises the discrete locations of the user at a corresponding date/time. The location and/or path of the user may be displayed on a map. The location of the user may be compared to a schedule of the user (e.g., a guard tour schedule) to see if the user is on schedule or not. In the case that the user is behind schedule, an alert may be generated. The alert may be displayed on a display of the server 110 or of a workstation connected to the server 110, such that an operator becomes aware that the person (e.g. guard) is behind schedule. The alert may be transmitted to the mobile device 104, such that the user becomes aware that he/she is behind schedule. In some embodiments, reports for a give user may be generated. For example, if an operator desires to know the location of a user (e.g., a security guard) for a given time (or range of time) and date, the operator may input in the time/date information, and the server 110 may automatically generate the report. The report may include the new video stream generated by combining the video streams that the flashing light pattern of that user was detected therein. The report may include information as to the location of the user at different periods of time. Based on the above, the method 300 may be modified in various manners. For example, multiple video cameras (i.e., at least two) may capture the visual identifier over a period of time (e.g., the time a guard performs a guard tour), the visual identifier may be detected in multiple video streams (i.e., at least two) over the period of time, and a new video stream may be generated from the multiple video streams having the visual identifier detected therein, and, the new video stream may be outputted to a display device and/or stored in a computer readable memory and/or storage device—in this example, steps 316 and/or 318 may be omitted. By way of another example, after step 316 of method 300 is performed, a geographical location of the identified video camera $102_N$ capturing the visual identifier is determined (e.g., the server 110 may store location information of the cameras 102 and the location of camera $102_N$ may be obtained), and the geographical location may be outputted to a display device and/or stored in a computer readable memory and/or storage device—in this example, step 318 may be omitted. The previously described example may be further modified to associate the geographical location to a location of the user, and alternatively the location of the user is outputted to a display device and/or stored in a computer readable memory and/or storage device.

The systems and/or methods described herein may be applicable to systems and/or methods for adjusting a camera, such as a pan-tilt-zoom (PTZ) camera. The server 110 may be configured to identify the location of the visual identifier within the video frame. The server 110 may be configured to command the camera to track the visual identifier. The server 110 may transmit PTZ commands to the camera to keep the visual identifier at the same location within the video frame. This may be used to quickly change a camera's viewpoint, record a preset position for the camera or simply quickly center the viewpoint to a specific location. Similarly, this may be used to confirm that a specific location is visible by multiple cameras at the same time. Based on the above, the method 300 may be modified to include one or more of the following steps: determining a position of the visual identifier (e.g., determining a position of a light feature) in at least one image of the video stream for the identified camera $102_N$; determining a command (e.g., a PTZ command) for the identified video camera $102_N$ to adjust its viewpoint based on the position of the visual identifier, and transmitting the command to the identified video camera $102_N$ for adjusting the its viewpoint. In this case, step 318 of method 300 may be omitted.

Figure 6:
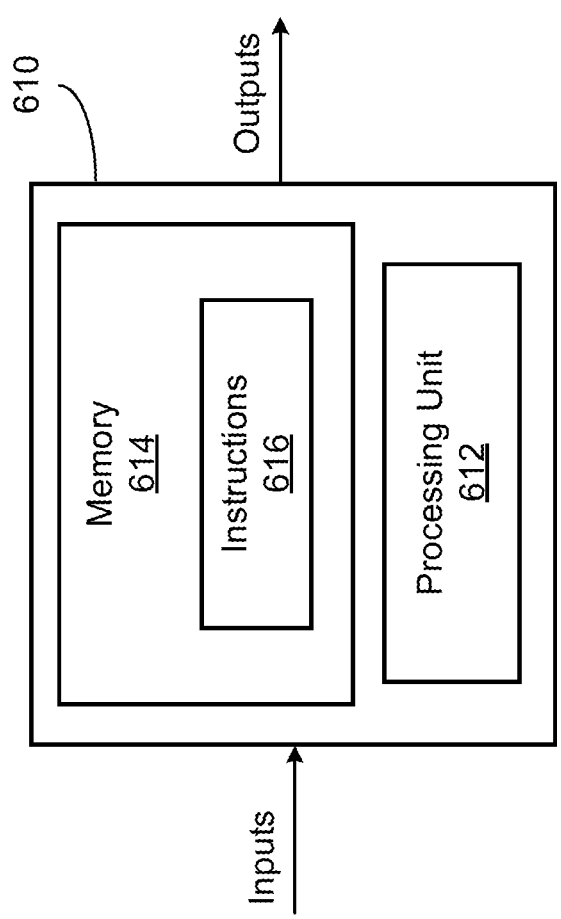
FIG. 6 is a schematic diagram of an example computing device, in accordance with one or more embodiments.

With reference to FIG. 6, the method(s) 300, 400, and/or 500, may be implemented by a computing device 610, comprising a processing unit 612 and a memory 614 which has stored therein computer-executable instructions 616. Each camera $102_i$, the server 110, and/or the mobile device 104 may each be implemented by and/or comprise at least one computing device, such as the computing device 610. The processing unit 612 may comprise any suitable devices configured to implement the method(s) 300, 400, and/or 500 such that instructions 616, when executed by the computing device 610 or other programmable apparatus, may cause the functions/acts/steps performed as part of the method(s) 300, 400, and/or 500 as described herein to be executed. The processing unit 612 may comprise, for example, any type of general-purpose microprocessor or microcontroller, a digital signal processing (DSP) processor, a central processing unit (CPU), a graphical processing unit (GPU), an integrated circuit, a field programmable gate array (FPGA), a reconfigurable processor, other suitably programmed or programmable logic circuits, or any combination thereof.

The memory 614 may comprise any suitable known or other machine-readable storage medium. The memory 614 may comprise non-transitory computer readable storage medium, for example, but not limited to, an electronic, magnetic, optical, electromagnetic, infrared, or semiconductor system, apparatus, or device, or any suitable combination of the foregoing. The memory 614 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 614 may comprise any storage means (e.g., devices) suitable for retrievably storing machine-readable instructions 616 executable by processing unit 612.

The methods and systems for identifying at least one video camera of a video surveillance environment described herein may be implemented in a high level procedural or object oriented programming or scripting language, or a combination thereof, to communicate with or assist in the operation of a computer system, for example the computing device 610. Alternatively, the methods and systems for identifying at least one video camera of a video surveillance environment may be implemented in assembly or machine language. The language may be a compiled or interpreted language. Program code for implementing the methods and systems for identifying at least one video camera of a video surveillance environment may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for identifying at least one video camera of a video surveillance environment may also be considered to be implemented by way of a non-transitory computer-readable storage medium having a computer program stored thereon. The computer program may comprise computer-readable instructions which cause a computer, or in some embodiments the processing unit 612 of the computing device 610, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

It should be noted that the term "server" used herein indicates network equipment which may provide server-like functions or take on server-like roles. However, it is not meant to designate a particular role in a server-client relationship or to defining a role in terms of initiator or responder in communications. Indeed, it is possible that in some embodiments, cameras behave as "servers" in the terms server-client relationship and the server may behave as a "client" or initiator of communication.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. A computer-implemented method for identifying at least one video camera of a video surveillance environment by a server in communication with a plurality of video cameras, the method comprising:
    obtaining, at the server, a plurality of video streams of the plurality of video cameras, at least one video camera of the plurality of video cameras capturing a time-varying visual identifier outputted by a mobile device;
    processing, at the server, the plurality of video streams to detect the time-varying visual identifier outputted by the mobile device in at least one video stream of the plurality of video streams based on searching for the time-varying visual identifier in the plurality of video streams, wherein the time-varying visual identifier is unique to the mobile device such that the time-varying visual identifier is different from at least another time-varying visual identifier of another mobile device in the video surveillance environment to allow the server to identify the mobile device outputting the time-varying visual identifier;
    identifying, at the server, the at least one video camera capturing the time-varying visual identifier outputted by the mobile device from the at least one video stream having the visual identifier detected therein; and
    transmitting, by the server, camera identification information of the at least one video camera capturing the time-varying visual identifier to the mobile device.

2. The method of claim 1, wherein the time-varying visual identifier outputted by the mobile device is a flashing light pattern outputted by a light source of the mobile device.

3. The method of claim 2, further comprising:
    determining, at the server, the flashing light pattern for the mobile device to output for requesting identification of the at least one video camera that captures the time-varying visual identifier;
    transmitting, by the server, visual identification information to the mobile device for the mobile device to at least in part generate the flashing light pattern based on the visual identification information; and
    wherein processing, at the server, the plurality of video streams comprises searching in the plurality of video streams for the flashing light pattern determined by the server to detect the flashing light pattern in the at least one video stream.

4. The method of claim 3, wherein the visual identification information transmitted to the mobile device from the server comprises a maximum frequency for the flashing light pattern.

5. The method of claim 3, wherein the visual identification information transmitted to the mobile device from the server comprises a minimum frame rate configuration of the plurality of video cameras.

6. The method of claim 3, further comprising:
    determining, at the server, a minimum frames rate configuration of the plurality of video cameras; and
    wherein determining, at the server, the flashing light pattern comprises determining, at the server, the flashing light pattern based on the minimum frame rate configuration.

7. The method of claim 2, wherein searching for the time-varying visual identifier in the plurality of video streams comprises searching in the plurality of video streams, by the server, for the flashing light pattern based on identifying light features in the plurality of video streams and comparing the light features to an expected flashing light pattern associated with the mobile device, and wherein detecting the flashing light pattern comprises identifying the at least on video stream having the light features corresponding within a level of certainty to the expected flashing light pattern associated with the mobile device.

8. The method of claim 1, further comprising:
    receiving, at the server, location information from the mobile device; and
    selecting, at the server, the plurality of video streams from a set of video streams based on the location information.

9. A server for identifying at least one video camera of a video surveillance environment, the server in communication with a plurality of video cameras, the server comprising:
    at least one processing unit; and
    at least one non-transitory computer-readable memory having stored thereon program instructions executable by the at least one processing unit for:
        obtaining, at the server, a plurality of video streams of the plurality of video cameras, at least one video camera of the plurality of video cameras capturing a time-varying visual identifier outputted by the mobile device;
        processing, at the server, the plurality of video streams to detect the time-varying visual identifier outputted by the mobile device in at least one video stream of the plurality of video streams based on searching for the time-varying visual identifier in the plurality of video streams, wherein the time-varying visual identifier is unique to the mobile device such that the time-varying visual identifier is different from at least another time-varying visual identifier of another mobile device in the video surveillance environment to allow the server to identify the mobile device outputting the time-varying visual identifier;

identifying, at the server, the at least one video camera capturing the time-varying visual identifier outputted by the mobile device from the at least one video stream having the visual identifier detected therein; and transmitting, by the server, camera identification information of the at least one video camera capturing the time-varying visual identifier to the mobile device.

10. The server of claim 9, wherein the time-varying visual identifier outputted by the mobile device is a flashing light pattern outputted by a light source of the mobile device.

11. The server of claim 10, wherein the program instructions are further executable by the at least one processing unit for:

determining, at the server, the flashing light pattern for the mobile device to output for requesting identification of the at least one video camera that captures the time-varying visual identifier;

transmitting, by the server, visual identification information to the mobile device for the mobile device to at least in part generate the flashing light pattern based on the visual identification information; and wherein processing, at the server, the plurality of video streams comprises searching in the plurality of video streams for the flashing light pattern determined by the server to detect the flashing light pattern in the at least one video stream.

12. The server of claim 11, wherein the visual identification information transmitted to the mobile device from the server comprises a maximum frequency for the flashing light pattern.

13. The server of claim 11, wherein the visual identification information transmitted to the mobile device from the server comprises a minimum frame rate configuration of the plurality of video cameras.

14. The server of claim 11, wherein the program instructions are further executable by the at least one processing unit for:

determining, at the server, a minimum frame rate configuration of the plurality of video cameras; and wherein determining, at the server, the flashing light pattern comprises determining, at the server, the flashing light pattern based on the minimum frame rate configuration.

15. The server of claim 10, wherein searching for the time-varying visual identifier in the plurality of video streams comprises searching in the plurality of video streams, by the server, for the flashing light pattern based on identifying light features in the plurality of video streams and comparing the light features to an expected flashing light pattern associated with the mobile device, and wherein detecting the flashing light pattern comprises identifying the at least on video stream having the light features corresponding within in a level of certainty to the expected flashing light pattern associated with the mobile device.

16. The server of claim 10, wherein the program instructions are further executable by the at least one processing unit for:

receiving, at the server, location information from the mobile device; and selecting, at the server, the plurality of video streams from a set of video streams based on the location information.

17. A server in communication with a plurality of video cameras, the server comprising:

at least one processing unit; and at least one non-transitory computer-readable memory having stored thereon program instructions executable by the at least one processing unit for:

obtaining, at the server, a plurality of video streams of the plurality of video cameras, at least one video camera of the plurality of video cameras capturing a time-varying visual identifier outputted by a mobile device;

processing, at the server, the plurality of video streams to detect the time-varying visual identifier outputted by the mobile device in at least one video stream of the plurality of video streams based on searching for the time-varying visual identifier in the plurality of video streams, wherein the time-varying visual identifier is unique to the mobile device to allow the server to identify the mobile device outputting the time-varying visual identifier;

identifying, at the server, the at least one video camera capturing the time-varying visual identifier outputted by the mobile device from the at least one video stream having the visual identifier detected therein;

storing an indication of the at least one video camera capturing the visual identifier in the computer-readable memory or in at least one storage device.

18. The server of claim 17, wherein the time-varying visual identifier outputted by the mobile device is a flashing light pattern outputted by a light source of the mobile device.

19. The server of claim 18, wherein the flashing light pattern is an infrared light pattern, and wherein the light source is an infrared light source.

20. The server of claim 17, wherein at least two video cameras of the plurality of video cameras capture the time-varying visual identifier outputted by the mobile device;

wherein processing, at the server, the plurality of video streams comprises processing, at the server, the plurality of video streams to detect the time-varying visual identifier in at least two video streams of the plurality of video streams based on searching in the plurality of video streams for the time-varying visual identifier;

wherein identifying, at the server, the at least one video camera capturing the time-varying visual identifier comprises identifying, at the server, the at least two video cameras capturing the time-varying visual identifier outputted by the mobile device from the at least two video streams having the visual identifier detected therein;

and wherein the program instructions are further executable by the at least one processing unit for:

tracking, at the server, movement of the mobile device outputting the time-varying visual identifier based on geographical locations of the least two video cameras identified as capturing the time-varying visual identifier outputted by the mobile device.

21. The method of claim 1, further comprising:

obtaining, at the server, identification information of the mobile device outputting the time-varying visual identifier from the time-varying visual identifier detected in the at least one video stream at the server; and identifying, by the server, the mobile device to transmit the camera identification information of the at least one video camera capturing the time-varying visual identifier thereto based on the identification information of the mobile device obtained from the time-varying visual identifier detected in the at least one video stream.

22. The server of claim 9, wherein the program instructions are further executable by the at least one processing unit for:

obtaining, at the server, identification information of the mobile device outputting the time-varying visual identifier from the time-varying visual identifier detected in the at least one video stream at the server; and identifying, by the server, the mobile device to transmit the camera identification information of the at least one video camera capturing the time-varying visual identifier thereto based on the identification information of the mobile device obtained from the time-varying visual identifier detected in the at least one video stream.

23. The server of claim 18, wherein the program instructions are further executable by the at least one processing unit for:

determining, at the server, the flashing light pattern for the mobile device to output for requesting identification of the at least one video camera that captures the time-varying visual identifier;

transmitting, by the server, visual identification information to the mobile device for the mobile device to at least in part generate the flashing light pattern based on the visual identification information; and wherein processing, at the server, the plurality of video streams comprises searching in the plurality of video streams for the flashing light pattern determined by the server to detect the flashing light pattern in the at least one video stream.

24. The server of claim 23, wherein the visual identification information transmitted to the mobile device from the server comprises a maximum frequency for the flashing light pattern.

25. The server of claim 23, wherein the visual identification information transmitted to the mobile device from the server comprises a minimum frame rate configuration of the plurality of video cameras.

26. The server of claim 23, wherein the program instructions are further executable by the at least one processing unit for:

determining, at the server, a minimum frame rate configuration of the plurality of video cameras; and wherein determining, at the server, the flashing light pattern comprises determining, at the server, the flashing light pattern based on the minimum frame rate configuration.

27. The server of claim 18, wherein searching for the time-varying visual identifier in the plurality of video streams comprises searching in the plurality of video streams, by the server, for the flashing light pattern based on identifying light features in the plurality of video streams and comparing the light features to an expected flashing light pattern associated with the mobile device, and wherein detecting the flashing light pattern comprises identifying the at least on video stream having the light features corresponding within in a level of certainty to the expected flashing light pattern associated with the mobile device.

28. The server of claim 18, wherein the program instructions are further executable by the at least one processing unit for:

receiving, at the server, location information from the mobile device; and selecting, at the server, the plurality of video streams from a set of video streams based on the location information.

29. The server of claim 17, wherein the program instructions are further executable by the at least one processing unit for:

obtaining, at the server, identification information of the mobile device outputting the time-varying visual identifier from the time-varying visual identifier detected in the at least one video stream at the server; and identifying, by the server, the mobile device to transmit the camera identification information of the at least one video camera capturing the time-varying visual identifier thereto based on the identification information of the mobile device obtained from the time-varying visual identifier detected in the at least one video stream.

* * * * *